US011111086B2

(12) United States Patent
Buchanan et al.

(10) Patent No.: US 11,111,086 B2
(45) Date of Patent: Sep. 7, 2021

(54) GLASS STACKING SYSTEMS AND METHODS

(71) Applicant: Cardinal IG Company, Eden Prairie, MN (US)

(72) Inventors: Robert C. Buchanan, Spring Green, WI (US); Karl T. Chic, Madison, WI (US)

(73) Assignee: CARDINAL IG COMPANY, Eden Prairie, MN (US)

(*) Notice: Subject to any disclaimer, the term of this patent is extended or adjusted under 35 U.S.C. 154(b) by 0 days.

(21) Appl. No.: 16/680,485

(22) Filed: Nov. 11, 2019

(65) Prior Publication Data
US 2021/0139254 A1 May 13, 2021

(51) Int. Cl.
B65G 49/06 (2006.01)

(52) U.S. Cl.
CPC ......... B65G 49/068 (2013.01); B65G 49/061 (2013.01)

(58) Field of Classification Search
CPC ............................ B65G 49/068; B65G 49/061
See application file for complete search history.

(56) References Cited

U.S. PATENT DOCUMENTS

| | | | |
|---|---|---|---|
| 2,049,850 A | 8/1936 | Lytle et al. | |
| 2,637,951 A | 5/1953 | Hite | |
| 2,837,876 A | 6/1958 | Kocher | |
| 2,966,013 A | 12/1960 | Hanneken | |
| 3,279,664 A | 10/1966 | Lynch | |
| 3,570,186 A | 3/1971 | Kulwicki | |
| 3,800,477 A | 4/1974 | McKelvey et al. | |
| RE28,609 E * | 11/1975 | Malburet | B65G 57/28 214/1 |

(Continued)

FOREIGN PATENT DOCUMENTS

| | | |
|---|---|---|
| CN | 208979868 U | 6/2019 |
| CN | 208979869 U | 6/2019 |

(Continued)

OTHER PUBLICATIONS

"129—(N)—Destacker Double Head + Transfer," NORDA S.p.A., retrieved from the Internet from https://www.youtube.com/watch?v=dYK9cxxXJ6o, published Aug. 22, 2012, 1 page.

(Continued)

Primary Examiner — Lynn E Schwenning
(74) Attorney, Agent, or Firm — Fredrikson & Byron, P.A.

(57) ABSTRACT

The invention provides systems and methods for robotically stacking sheets. The systems and methods involve a robot arm and a conveyor line. The robot arm has attached thereto a suction frame. In some embodiments, the systems and methods involve first and second robot arms. In such embodiments, the system and method facilitate and involve a sequentially alternating unloading operation such that the system has a first position in which the first robot arm is elevated and has the first suction frame loaded with one or more sheets while the second robot arm is lowered and has the second suction frame unloaded and the system has a second position in which the second robot arm is elevated and has the second suction frame loaded with one or more sheets while the first robot arm is lowered and has the first suction frame unloaded.

51 Claims, 23 Drawing Sheets

(56) References Cited

U.S. PATENT DOCUMENTS

| | | | |
|---|---|---|---|
| 3,932,962 A | 1/1976 | Devillers | |
| 4,060,937 A | 12/1977 | Glazer | |
| 4,200,420 A | 4/1980 | Cathers et al. | |
| 4,228,886 A | 10/1980 | Moran | |
| 4,228,993 A | 10/1980 | Cathers | |
| 4,375,141 A | 3/1983 | Gaetano | |
| 4,426,811 A | 1/1984 | Eckardt et al. | |
| 4,437,268 A | 3/1984 | Righetti | |
| 4,559,001 A | 12/1985 | Wiedenhoefer et al. | |
| 4,623,296 A | 11/1986 | McGuire et al. | |
| 4,658,550 A | 4/1987 | Myers et al. | |
| 4,739,590 A | 4/1988 | Myers et al. | |
| 4,770,120 A | 9/1988 | Komatsu et al. | |
| 4,846,625 A | 7/1989 | Gabillet | |
| 5,005,318 A | 4/1991 | Shafir | |
| 5,030,059 A | 7/1991 | Favre | |
| 5,330,311 A | 7/1994 | Cawley et al. | |
| 5,620,293 A | 4/1997 | Alarcon-Lopez et al. | |
| 5,632,590 A | 5/1997 | Pearson et al. | |
| 5,700,128 A | 12/1997 | Tonnigs et al. | |
| 6,416,382 B1 | 7/2002 | Bavelloni | |
| 6,428,390 B1 | 8/2002 | Clark et al. | |
| 6,659,265 B2 | 12/2003 | Pfeilschifter et al. | |
| 6,685,541 B2 | 2/2004 | Brown et al. | |
| 6,796,886 B2 | 9/2004 | Bushell | |
| 6,807,461 B2 * | 10/2004 | Kneifel, II | G05B 19/41815 700/248 |
| 6,898,833 B2 | 5/2005 | Ashton | |
| 6,976,574 B2 | 12/2005 | Franz | |
| 7,001,249 B1 | 2/2006 | Pride et al. | |
| 7,056,191 B2 | 6/2006 | Takatsuji et al. | |
| 7,094,128 B2 | 8/2006 | Vianello et al. | |
| 7,140,953 B1 | 11/2006 | Raynauld | |
| 7,275,979 B2 | 10/2007 | Raynauld | |
| 7,771,248 B2 | 8/2010 | Vianello et al. | |
| 8,210,339 B2 | 7/2012 | Strass | |
| 8,231,431 B2 | 7/2012 | Gajaria et al. | |
| 8,276,960 B2 | 10/2012 | Franz et al. | |
| 8,282,443 B2 | 10/2012 | Vianello et al. | |
| 8,449,348 B2 | 5/2013 | Sondag | |
| 8,540,551 B2 | 9/2013 | Brown et al. | |
| 8,590,688 B2 | 11/2013 | Weigl | |
| 8,757,355 B2 | 6/2014 | Weigl | |
| 8,788,086 B2 | 7/2014 | Franz | |
| 9,718,629 B2 | 8/2017 | Wenninger et al. | |
| 9,925,634 B2 | 3/2018 | Queck et al. | |
| 10,377,583 B2 | 8/2019 | Strass | |
| 10,464,760 B2 * | 11/2019 | Herfert | B65G 49/067 |
| 2002/0046919 A1 | 4/2002 | Gariglio | |
| 2002/0061712 A1 | 5/2002 | Gariglio | |
| 2002/0180142 A1 * | 12/2002 | Sisk | B65G 49/067 271/198 |
| 2003/0062245 A1 * | 4/2003 | Pfeilschifter | B65G 47/904 198/339.1 |
| 2003/0118436 A1 * | 6/2003 | Kameda | B65G 61/00 414/799 |
| 2004/0007020 A1 | 1/2004 | Kanno et al. | |
| 2004/0240981 A1 | 12/2004 | Dothan et al. | |
| 2006/0099064 A1 * | 5/2006 | Anaki | B65G 49/068 414/797 |
| 2010/0106288 A1 * | 4/2010 | Strass | B65G 49/064 700/218 |
| 2012/0207575 A1 | 8/2012 | Masoero et al. | |
| 2013/0116822 A1 | 5/2013 | Atohira | |
| 2015/0005923 A1 | 1/2015 | Gu | |
| 2015/0259159 A1 | 9/2015 | Herfert | |
| 2015/0274420 A1 | 10/2015 | Krommer | |
| 2015/0274440 A1 | 10/2015 | Strass | |
| 2018/0207765 A1 | 7/2018 | Queck et al. | |

FOREIGN PATENT DOCUMENTS

| | | |
|---|---|---|
| DE | 4419963 C1 | 9/1995 |
| DE | 202012010085 U1 | 1/2013 |
| DE | 102014017968 A1 | 4/2016 |
| EP | 1101743 A2 | 5/2001 |
| EP | 1473261 A1 | 11/2004 |
| EP | 3450362 A1 | 3/2019 |
| JP | S61079559 A | 4/1986 |
| JP | 2001139138 A | 5/2001 |
| JP | 2001180822 A | 7/2001 |
| WO | 2018233741 A1 | 12/2018 |

OTHER PUBLICATIONS

European Patent Application No. 20156078.6, Extended European Search Report dated Jul. 27, 2020, 9 pages.

"Grenzebach Tin Air Speed Stacker TASS with Siemens inside," Siemens, retrieved from the Internet from https://www.youtube.com/watch?v=DcSoxPBWvOA, published Oct. 22, 2018, 1 page.

"ROBOLOAD-PRO™ Automatic Loading & Unloading Systems," Ashton Industrial, Retrieved online from <http://www.ashton-industrial.com/?page_id=19> on Apr. 23, 2020, and believed to be publicly available more than one year prior to the filing date of the instant application, 2 pages.

"Robot Handling Equipment," Ashton Industrial, Retrieved online from <http://www.ashton-industrial.com/?page_id=2884> on Aug. 27, 2020, and believed to be publicly available more than one year prior to the filing date of the instant application, 1 page.

"Why ATI Tool Changers?" ATI Industrial Automation, retrieved online from <https://www.youtube.com/watch?time_continue=38&v=kDP-oofDn4w&feature=emb_title&app=desktop>, published Feb. 5, 2016, 2 pages.

"Ashton Industrial RoboLoad Pro," Ashton Industrial, Retrieved online from <https://www.youtube.com/watch?time_continue=383&v=tXWmjG2UyeQ&feature=emb_title>, published Jul. 26, 2011, 1 page.

Factory layout of SeamMaXX Pro and ShapeSeam Pro lines, Ashton Industrial, dated Jan. 10, 2013 at 11:25 AM, 3 pages.

Factory layout of SeamMaXX Pro and ShapeSeam Pro lines, Ashton Industrial, dated Jan. 10, 2013 at 7:41 AM, 3 pages.

"Mobile Robot Work Cells," Robotics Bible, Dec. 14, 2011, Retrieved online from <http://www.roboticsbible.com/mobile-robot-work-cells.html>, 5 pages.

Offer for ShapeSeam-Pro from Ashton Industrial, dated Aug. 27, 2012, 10 pages.

Pretempering Machinery, Ashton Industrial Sales, retrieved from internet on Oct. 8, 2014, from http://www.ashton-industrial.com/?page_id=1329, 1 page.

Waurzyniak, "Automating with Vision," Manufacturing Engineering, Nov. 1, 2007, Retrieved online from <http://sme.org/MEMagazine/Article.aspx?id=20205&taxid=1460>, 4 pages.

Seammaxx-Pro, Ashton Industrial Sales, retrieved from the internet on Oct. 8, 2014, from http://www.ashton-industrial.com/?page_id=80, 2 pages.

Shapeseam-Pro, Ashton Industrial Sales, retrieved from the internet on Oct. 8, 2014, from http://www.ashton-industrial.com/?page_id=1931, 5 pages.

* cited by examiner

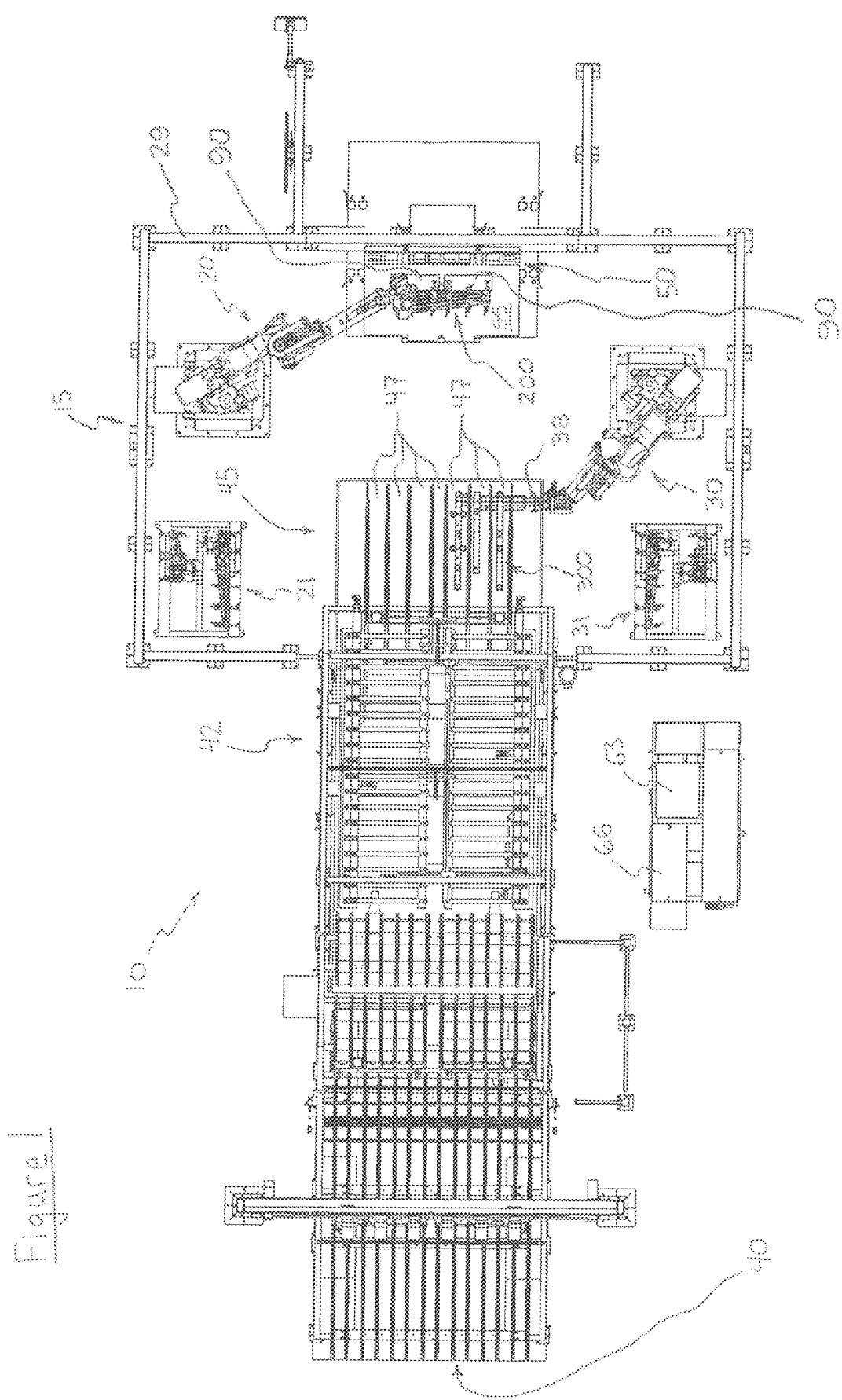

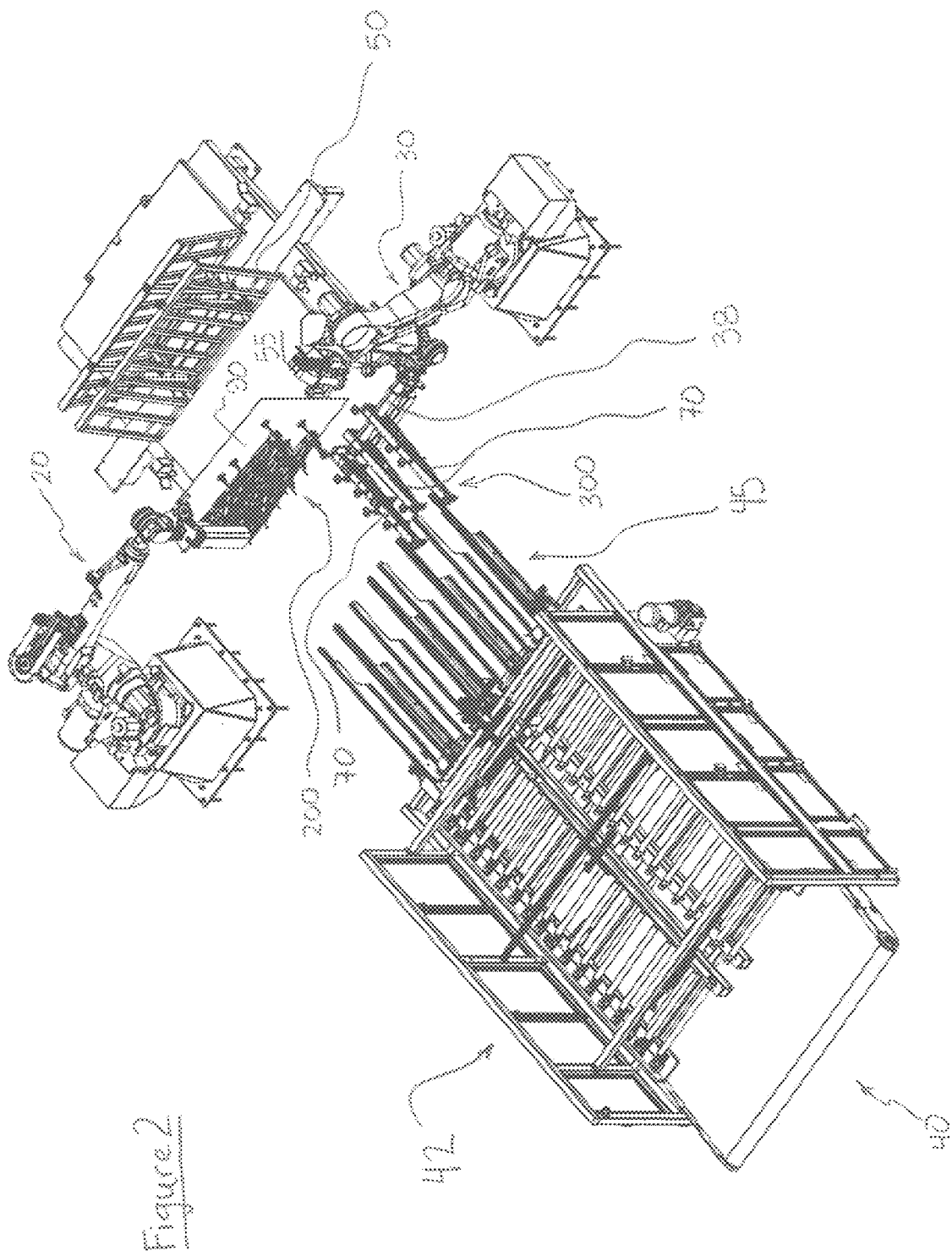

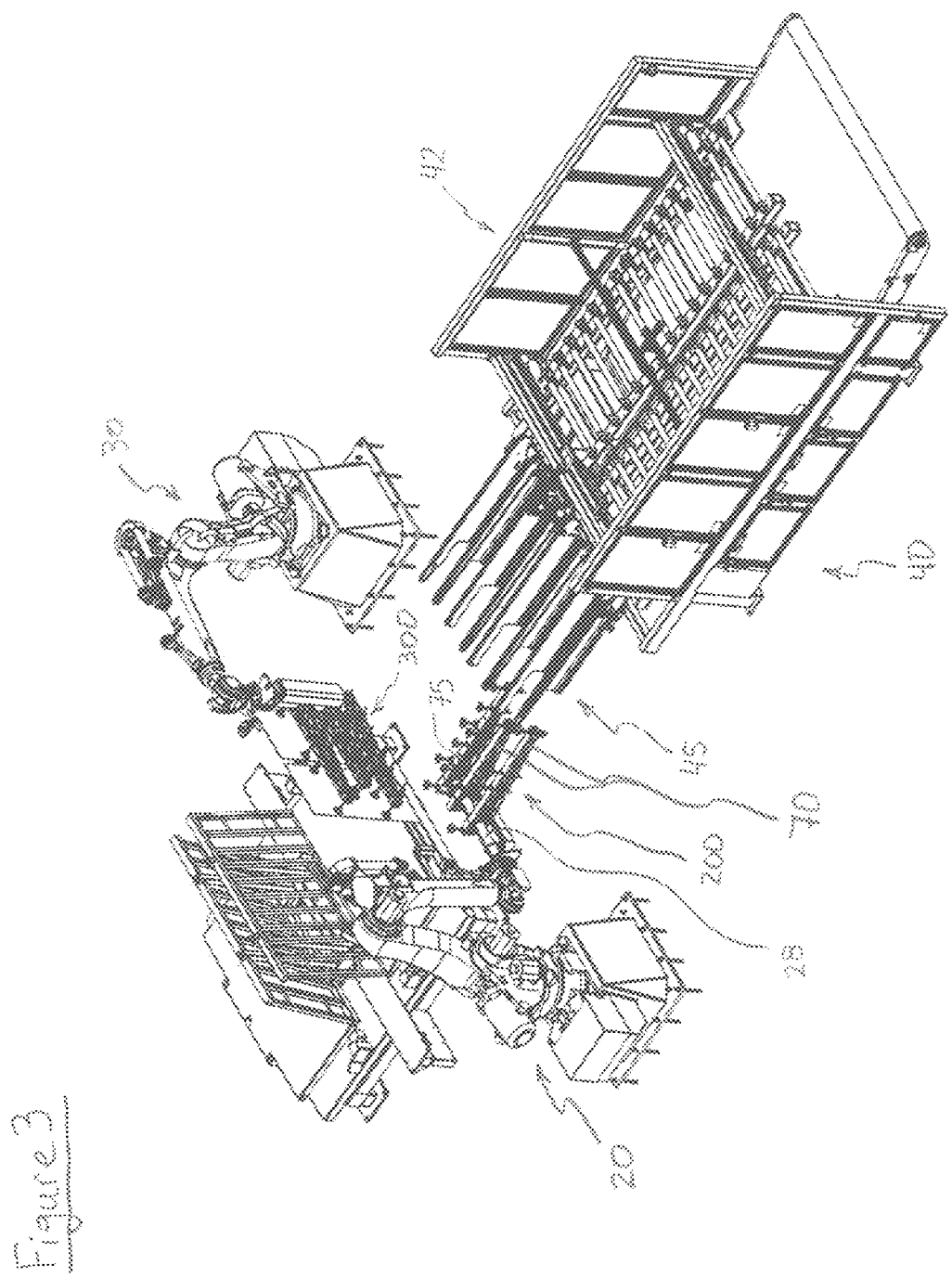

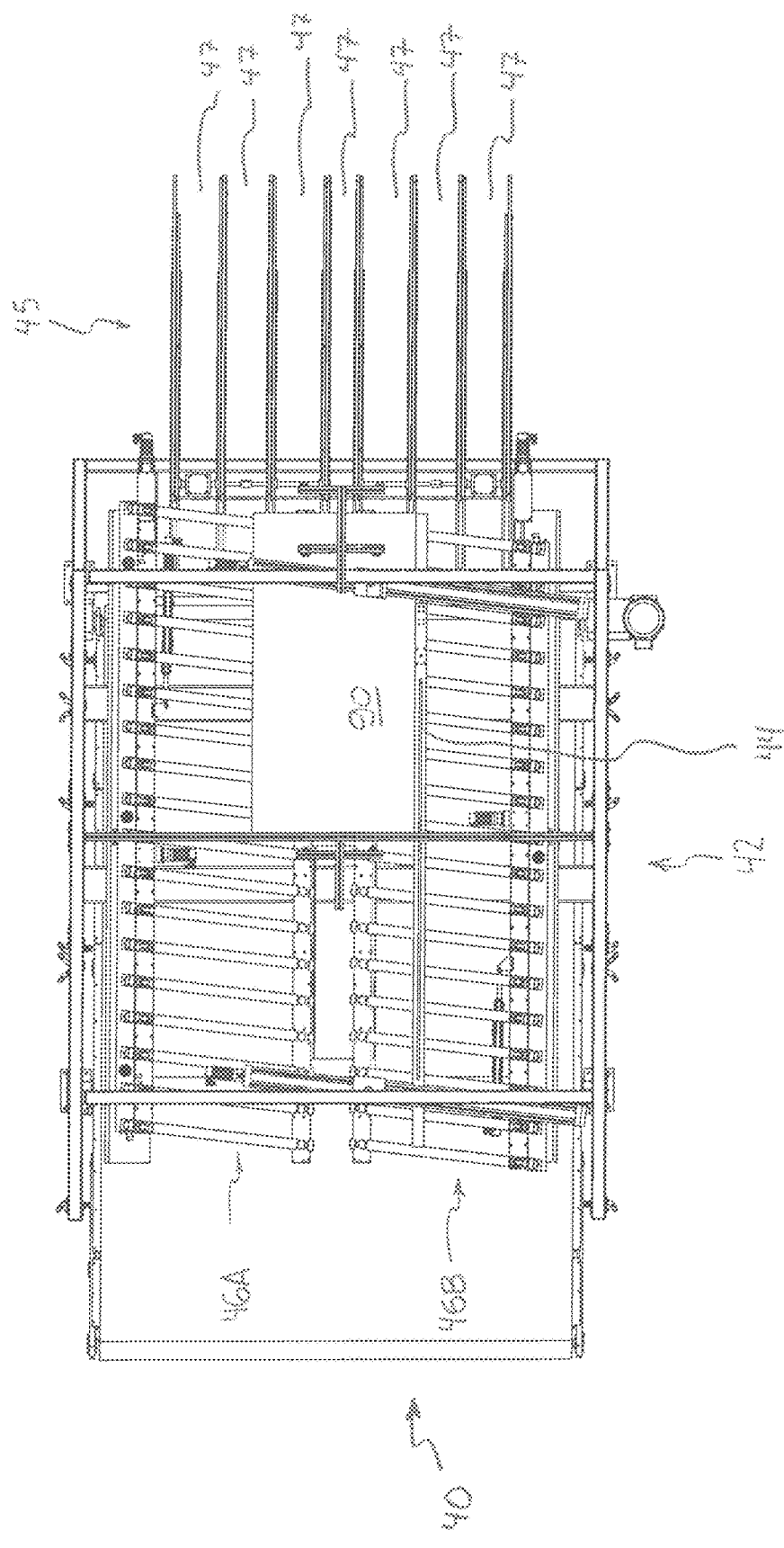

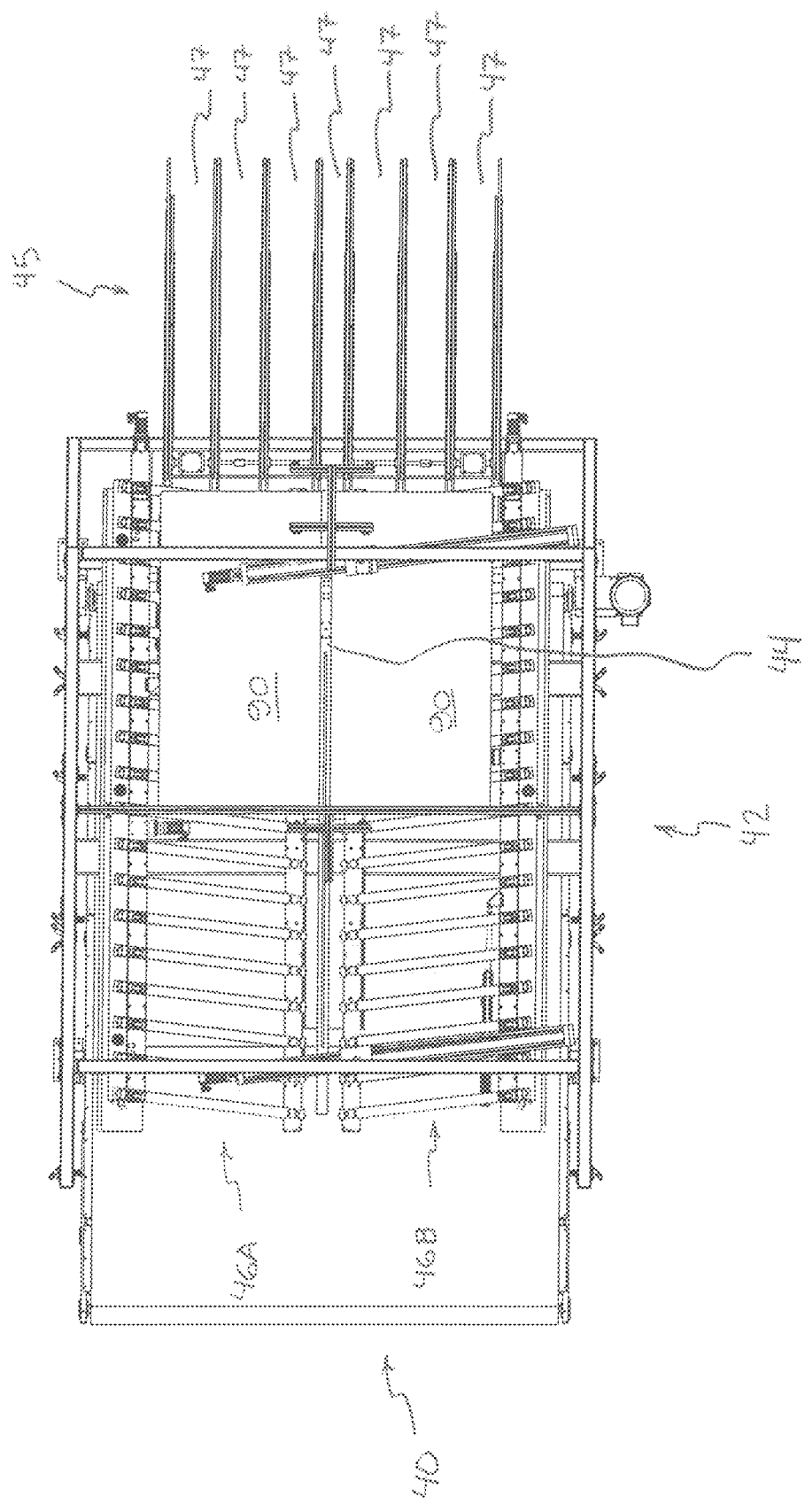

GLASS STACKING SYSTEMS AND METHODS

TECHNICAL FIELD

The present disclosure relates generally to equipment and methods for stacking sheets. More particularly, this disclosure relates to equipment and methods for removing sheets from a conveyor line and stacking them on a rack.

BACKGROUND

Sheets are often transported along conveyor lines in manufacturing facilities. In some situations, it is desirable to remove the sheets from the conveyor line. This has been done manually, e.g., by workers physically picking-up the sheets and placing them on a nearby rack. It has also been done through automation, e.g., various automated glass stacking systems have been used. Existing systems, however, have limitations. For example, some are limited in terms of their throughput time, thus limiting the maximum feasible conveyance rate of glass on the conveyor line. Additionally or alternatively, some automated glass stacking systems are limited in terms of their ability to turn/rotate the glass sheets during the stacking operation, in terms of their ability to simultaneously stack multiple glass sheets, or both.

It would be desirable to provide automated equipment and methods for removing sheets from a conveyor line and stacking them on a rack. It would be particularly desirable to provide equipment and methods of this nature that offer the ability to turn/rotate the sheets about multiple axes, simultaneously stack multiple sheets, or both. It would also be desirable to provide such equipment and methods with an efficient station area and a structural arrangement that enables swift, continuous, and reliable stacking. In addition, it would be desirable to provide such equipment and methods that facilitate stacking a variety of sheet sizes, shapes, and loading sequences.

SUMMARY

In certain embodiments, the invention provides a robotic sheet stacking system that includes first and second robot arms and a conveyor line. The first and second robot arms are located on opposite sides of the conveyor line. The first robot arm has attached thereto a first suction frame. The second robot arm has attached thereto a second suction frame. The system has a first position in which the first robot arm is elevated and has the first suction frame loaded with one or more sheets while the second robot arm is lowered and has the second suction frame unloaded, and the system has a second position in which the second robot arm is elevated and has the second suction frame loaded with one or more sheets while the first robot arm is lowered and has the first suction frame unloaded.

In other embodiments, the invention provides a method of using a robotic sheet stacking system to stack glass sheets. The robotic sheet stacking system includes first and second robot arms and a conveyor line. The method involves conveying a plurality of glass sheets along the conveyor line and moving the first and second robot arms in a sequentially alternating unloading operation, such that the system has a first position in which the first robot arm is elevated and has the first suction frame loaded with one or more sheets while the second robot arm is lowered and has the second suction frame unloaded, and the system has a second position in which the second robot arm is elevated and has the second suction frame loaded with one or more sheets while the first robot arm is lowered and has the first suction frame unloaded.

Some embodiments of the invention provide a robotic sheet stacking system that includes first and second robot arms and a conveyor line. The conveyor line is configured to convey glass sheets in a machine direction along which the conveyor line is elongated. In the present embodiments, the first and second robot arms are located on opposite sides of the conveyor line and are configured to move independently of each other. The first robot arm includes a free end region having attached thereto a first suction frame. The second robot arm includes a free end region having attached thereto a second suction frame. In the present embodiments, the conveyor line has a cantilevered end region with an underpass that is open on a downstream side, such that the first and second suction frames are each configured to travel in a counter-machine direction, starting from a downstream position that is spaced from the cantilevered end region in the machine direction, to an approach position underneath the cantilevered end region. In some of the present embodiments, the first suction frame when in the approach position is in a first rotational orientation about a vertical axis, the first suction frame when in the downstream position is in a second rotational orientation about a vertical axis, and the first and second rotational orientations are offset by greater 25 degrees, such as between 30 and 60 degrees. Preferably, the cantilevered end region of the conveyor line has a plurality of individual conveyors bounding between them a plurality of longitudinal gaps. The longitudinal gaps preferably are elongated in the machine direction and are configured to enable the first suction frame to project upwardly through the longitudinal gaps so as to engage one or more glass sheets on the cantilevered end region of the conveyor line. The longitudinal gaps preferably are open on a downstream end. In the present embodiments, the first and second robot arms respectively may have first and second mount bases that are spaced laterally outwardly and longitudinally downstream from the cantilevered end region of the conveyor line. In such cases, the first and second mount bases preferably are each mounted to a floor.

Certain embodiments of the invention provide a method of using a robotic sheet stacking system to stack glass sheets. The robotic sheet stacking system includes first and second robot arms and a conveyor line. In the present embodiments, the method includes conveying a glass sheet along the conveyor line in a machine direction. The conveyor line (e.g., at least an end region thereof) is elongated in the machine direction. Preferably, the first and second robot arms are located on opposite sides of the conveyor line. The present method includes moving the first and second robot arms independently of each other. The first robot arm includes a free end region having attached thereto a first suction frame. The second robot arm includes a free end region having attached thereto a second suction frame. In the present embodiments, the conveyor line has a cantilevered end region with an underpass that is open on a downstream side. The present method includes sequentially moving the first and second robot arms, such that the first and second suction frames sequentially travel in a counter-machine direction, each starting from a downstream position that is spaced from the cantilevered end region in the machine direction, to an approach position underneath the cantilevered end region. Preferably, the method includes operating the first robot arm to lift a first sheet from the conveyor line and thereafter rotate the first sheet about multiple axes, and subsequently operating the second robot arm to lift a second sheet from the conveyor line and thereafter rotate the second sheet about multiple axes.

In some embodiments, the invention provides a robotic sheet stacking system including a robot arm and a conveyor line. In the present embodiments, the robot arm is rotatable about multiple axes, preferably four or more (e.g., six) axes. The robot arm has a free end region to which is attached a suction frame. Preferably, the robot arm has a vertical rotation axis that is spaced laterally outwardly and longitudinally downstream from an end region of the conveyor line.

The details of one or more examples are set forth in the accompanying drawings and the description below. Other features, objects, and advantages will be apparent to skilled artisans given the present descriptions, drawings, and claims.

BRIEF DESCRIPTION OF DRAWINGS

FIG. 1 is a top view of a robotic sheet stacking system in accordance with certain embodiments of the present invention.

FIG. 2 is a perspective view of a robotic sheet stacking system in accordance with certain embodiments of the invention, showing a first robot arm transporting a single sheet.

FIG. 7 is yet another perspective view of the robotic sheet stacking system of FIG. 2, showing a first robot arm preparing to lift a pair of sheets off an end region of a conveyor line while a second robot arm is loading a pair of sheets onto a rack.

FIG. 22 is top view of a skew conveyor useful in the robotic sheet stacking system of the present invention, showing a single sheet on the skew conveyor.

FIG. 23 is another top view of the skew conveyor of FIG. 22, showing two sheets on the skew conveyor.

DETAILED DESCRIPTION

Figure 4:
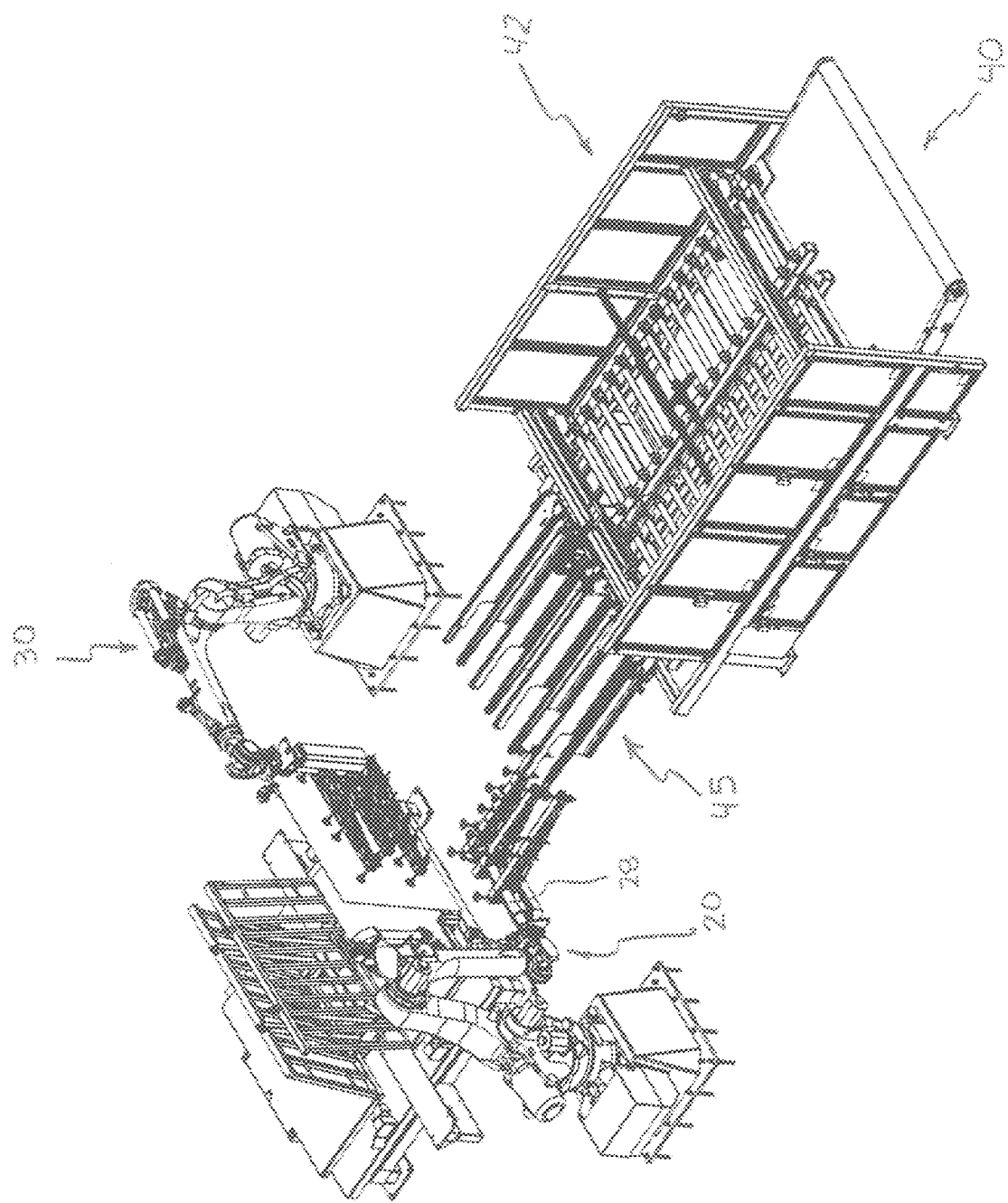
FIG. 4 is still another perspective view of the robotic sheet stacking system of FIG. 2, showing a second robot arm transporting a single sheet.

The invention provides a robotic sheet stacking system 10. Reference is made, for example, to FIGS. 1-11. In one group of embodiments, the system 10 has first 20 and second 30 robot arms and a conveyor line 40. The first 20 and second 30 robot arms are located on opposite sides of the conveyor line 40. The first robot arm 20 has attached thereto a first suction frame 200, while the second robot arm 30 has attached thereto a second suction frame 300.

The conveyor line 40 preferably is configured to convey sheets 90 in a horizontal (or at least generally horizontal) orientation. This orientation may be characterized by each so-positioned sheet 90 having opposed first and second major surfaces respectively facing upwardly and downwardly (e.g., such that the sheet lies in a horizontal plane). Reference is made to FIGS. 5-8 and 10-11.

The sheets 90 preferably are monolithic sheets of glass. It is to be appreciated, however, that the system 10 can alternatively be used with other types of substrates, such as polymer sheets. In some cases, the conveyor line 40 is a portion of a float glass production line (e.g., conveyor line 40 may be located at a cold end of a float glass production line). Thus, the conveyor line 40 may extend away from (e.g., may be located downstream of) a melting furnace, a float bath, and a cooling lehr. It is to be appreciated, however, that the present system 10 can also be used for various other applications. For example, the system can be used to stack glass sheets that are conveyed along a conveyor line extending away from a coating station where the glass is coated (e.g., with one or more thin films), such as a sputter coating line.

Thus, the illustrated conveyor line 40 defines a path of substrate travel, which preferably extends in a horizontal (or at least generally horizontal) direction. The conveyor line 40 may include a plurality of transport rollers and/or a plurality of conveyor belts. In the embodiments illustrated, the conveyor line 40 includes both an end region 45, which preferably comprises a plurality of laterally spaced-apart conveyor belts, and an adjacent upstream section 42, which preferably comprises a plurality of longitudinally spaced-apart transport rollers. Preferably, the conveyor line 40 is configured such that a sheet 90 conveyed along the conveyor line travels along the adjacent upstream section 42 and, from there, is conveyed directly onto the end region 45. In embodiments of this nature, there is a transition region where a sheet being conveyed from (e.g., positioned so as to span from) the adjacent upstream section 42 to the end region 45 is simultaneously supported by a plurality of transport rollers of the adjacent upstream section and a plurality of conveyor belts of the end region.

In the present group of embodiments, the two robot arms 20, 30 are positioned adjacent the end region 45 of the conveyor line 40. In the illustrated embodiment, the first 20 and second 30 robot arms are mounted at positions directly across an intermediate loading space from each other. The illustrated intermediate loading space is located downstream of the conveyor line end region 45, upstream of the rack 50, and laterally between the two robot arms 20, 30. Thus, the two robot arms 20, 30 preferably are mounted (and optionally have vertical rotation axes) at locations spaced laterally outwardly and longitudinally downstream from the end region 45 of the conveyor line 40.

The robot arms 20, 30 are not mechanically tied together (e.g., they are not both attached to a common suction frame). Instead, they are independently operable. The system 10 is configured such that the two robot arms 20, 30 alternate in removing one or more sheets 90 from the end region 45 of the conveyor line 40. For example, the suction frame 200 of the first robot arm 20 (e.g., while unloaded) can be lowered and moved toward the end region 45 of the conveyor line 40 while the suction frame 300 of the second robot arm 30 (e.g., while carrying one or more sheets) is elevated and moved toward a storage rack 50. Subsequently, the suction frame 300 of the second robot arm 30 (e.g., while unloaded) can be lowered and moved toward the end region 45 of the conveyor line 40 while the suction frame 200 of the first robot arm 20 (e.g., while carrying one or more sheets) is elevated and moved toward a storage rack 50.

Thus, in the present embodiment group, the system 10 is configured such that both robot arms 20, 30 are positioned to remove sheets 90 (and when operated, they remove sheets) from a single conveyor line 40. In addition, the two robot arms 20, 30 preferably are positioned to load such sheets 90 (and when operated, they load such sheets) onto a single rack 50. The illustrated rack 50 is directly downstream from (e.g., is in line with the path of substrate travel along) the end region 45 of the conveyor line 40. It is to be appreciated, however, that the system may alternatively be configured such that both robot arms remove sheets from the single conveyor line but then load the sheets onto two or more different racks, e.g., such that the first robot arm loads sheets onto a first rack while the second robot arm loads sheets onto a second rack.

Each robot arm 20, 30 has multiple axes of rotation. Preferably, each robot arm 20, 300 has four or more (e.g., six) axes of rotation. Such robot arms are commercially available from Fanuc of Yamanashi, Japan, for example, under model number R-2000iC/210L. While the robot arms 20, 30 are shown mounted to the floor, they can alternatively be suspended from an overhead frame or the like.

Coupled to the free end region of each robot arm 20, 30 is a suction frame 200, 300. Each suction frame 200, 300 is configured to releasably retain (e.g., to attach releasably to) one or more sheets 90. The sheets 90 preferably are glass sheets, although it is possible to use the system 10 with sheets of other materials, such as polycarbonate or other polymers.

Preferably, each suction frame 200, 300 includes a plurality of suction devices, such as suction cups (e.g., vacuum cups), that are configured to releasably retain one or more sheets 90. As is well known, suction cups are configured to retain glass sheets by virtue of an air pressure differential between the ambient environment surrounding each suction cup and the evacuated space between each suction cup and the sheet surface with which it is engaged.

In the illustrated embodiment, each suction frame 200, 300 comprises a plurality of frame members (e.g., arms) 70. Each frame member 70 carries (e.g., has mounted thereto) one or more (preferably a set of) suction cups. The illustrated frame members 70 are spaced apart from one another, e.g., so as to be configured to pass through respective longitudinal gaps 47 in the end region 45 of the conveyor line 40. Each illustrated frame member 70 projects from (e.g., is mounted on, so as to extend away from) the free end region 28, 38 of the respective robot arm 20, 30. In certain embodiments, each suction frame 200, 300 has three frame members (e.g., arms) 70, although the number of frame members can be varied. As examples, each suction frame may have two, three, four, five, or six frame members.

Preferably, the suction cups (e.g., vacuum cups) or other suction devices on the suction frames 200, 300 are configured to be actuated selectively. That is, they preferably are configured to be evacuated at a desired time (e.g., when it is desired to attach one or more sheets) and to subsequently be vented to atmosphere (e.g., when it is later desired to release such one or more sheets) at another desired time.

In the embodiment illustrated, one or more (optionally all) of the suction cups or other suction devices on the suction frames 200, 300 have an extended position and a retracted position. In embodiments of this nature, each suction cup or other suction device is configured to move selectively between the extended position and the retracted position. In more detail, each suction cup or other suction device can be configured to move from the retracted position to the extended position in response to operation of a pneumatic actuator. If desired, other actuator types can be used, such as electro-mechanical actuators (e.g., a motor can be provided to retract and extend one or more of the suction cups).

Figure 12:
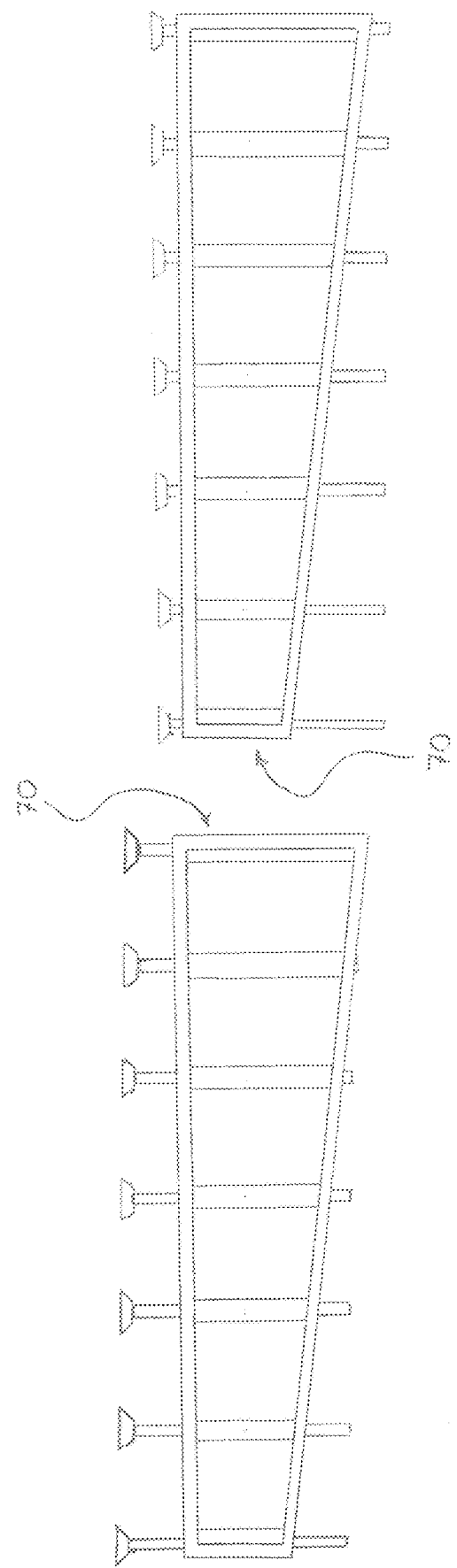
FIG. 12A is a schematic side view of a frame member of a suction frame in accordance with certain preferred embodiments of the invention, wherein a plurality of suctions cups are shown in an extended position.
FIG. 12B is a schematic side view of a frame member of a suction frame in accordance with certain preferred embodiments of the invention, wherein a plurality of suctions cups are shown in a retracted position.
Figure 13:
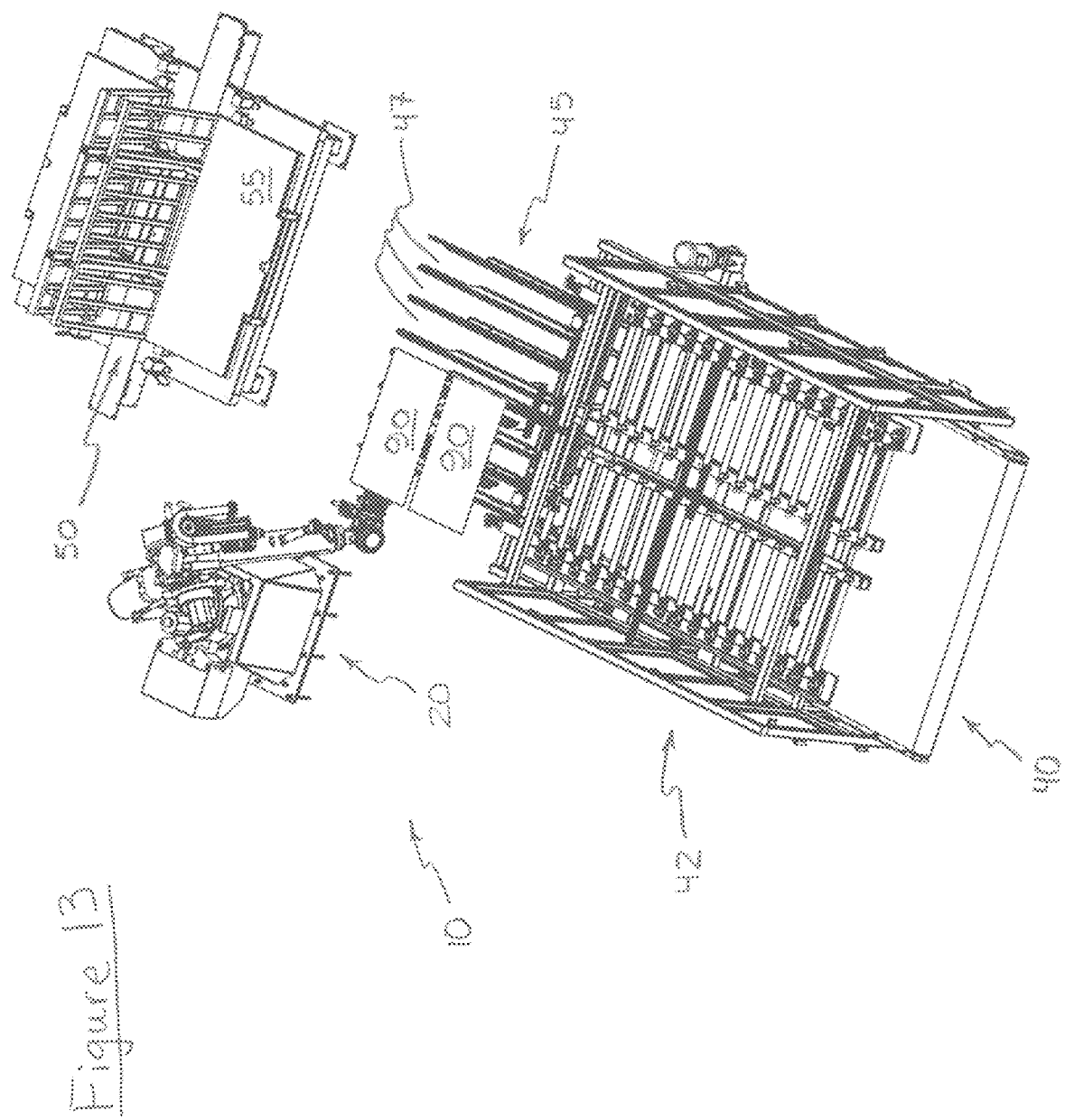
FIG. 13 is a perspective view of a robotic sheet stacking system in accordance with another embodiment of the invention, showing a pair of sheets on a left-side lane of a conveyor line of the system.
Figure 14:
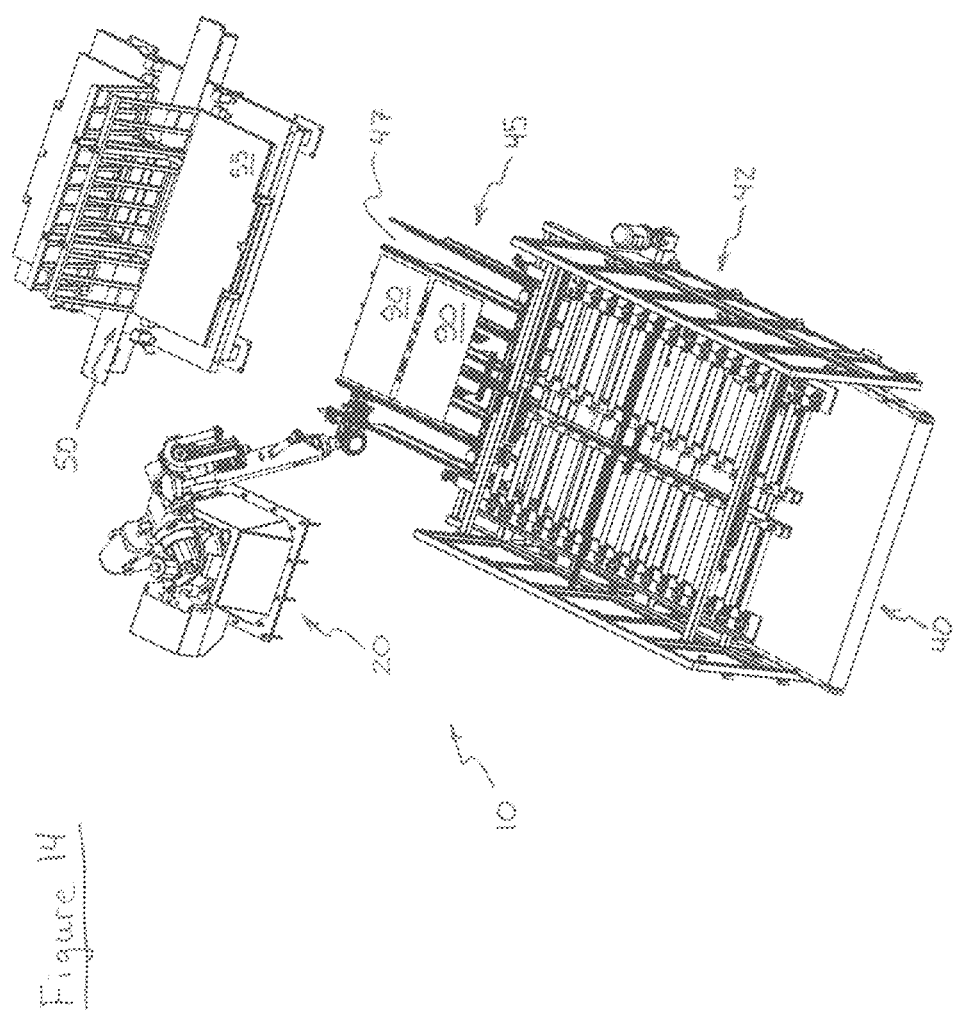
FIG. 14 is a perspective view of the robotic sheet stacking system of FIG. 13, showing a pair of sheets on a center lane of the conveyor line.
Figure 15:
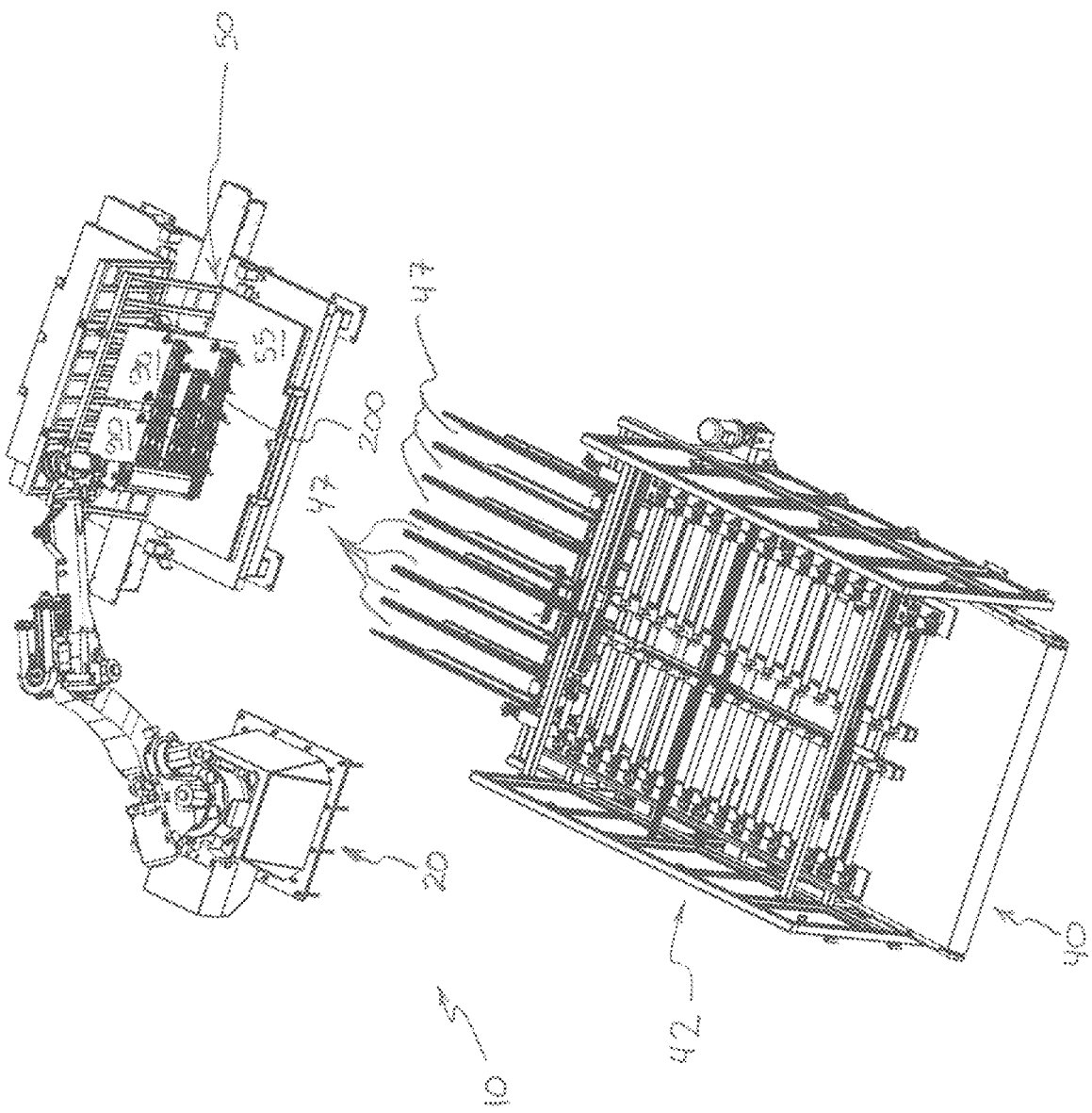
FIG. 15 is another perspective view of the robotic sheet stacking system of FIG. 13, showing a robot arm of the system loading a pair of sheets onto a rack.
Figure 16:
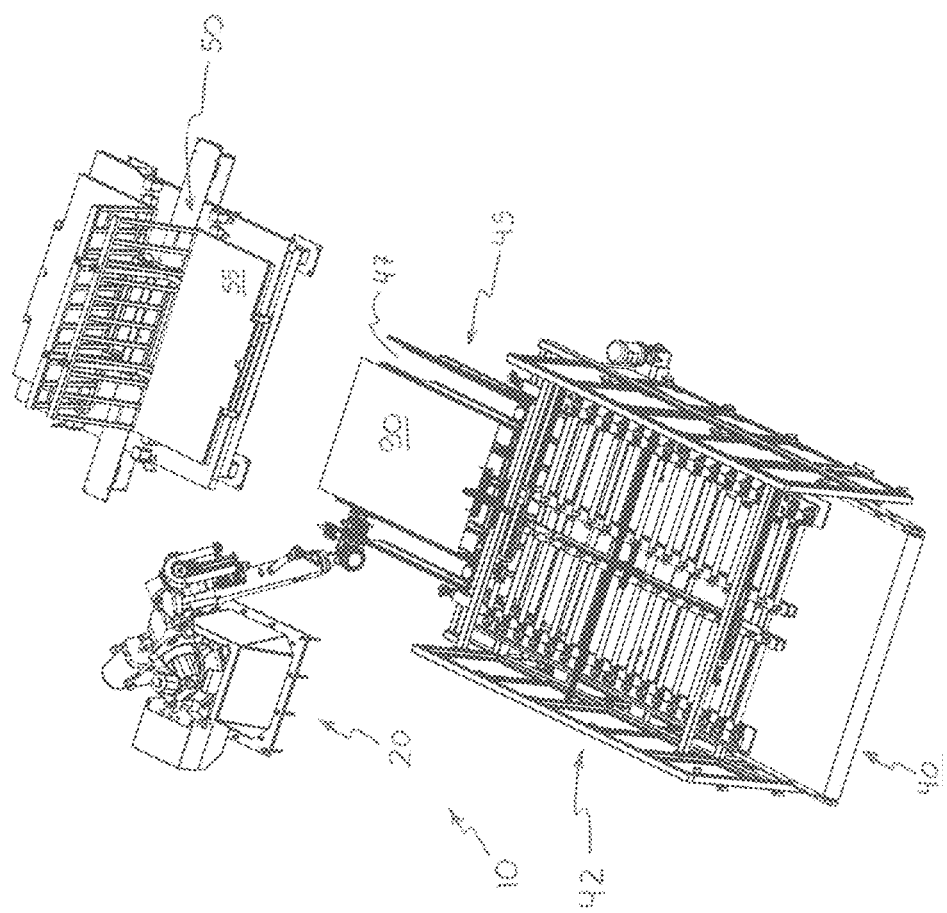
FIG. 16 is yet another perspective view of the robotic sheet stacking system of FIG. 13, showing the robot arm preparing to lift a sheet off an end region of the conveyor line.
Figure 17:
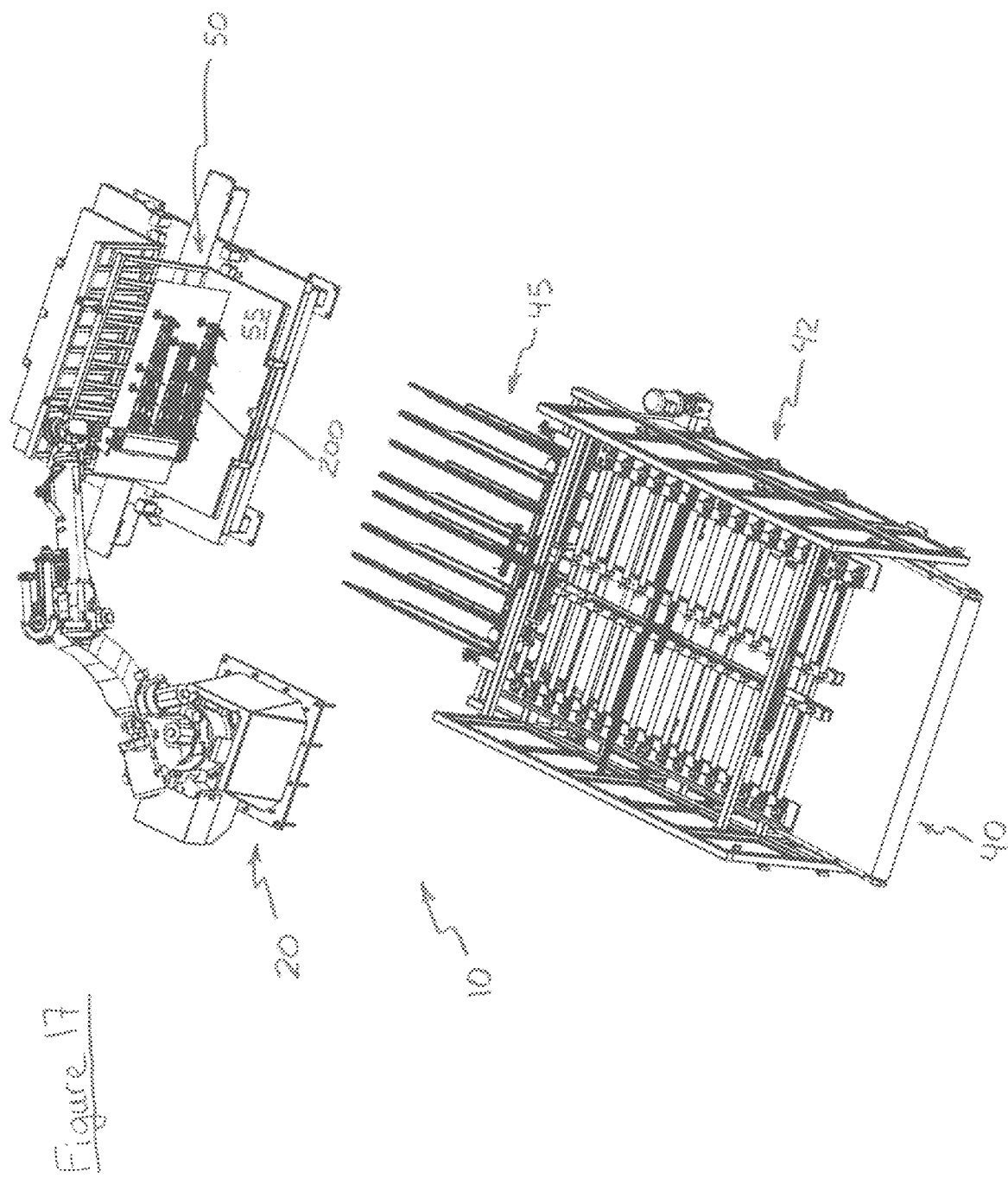
FIG. 17 is still another perspective view of the robotic sheet stacking system of FIG. 13, showing the robot arm loading a sheet onto a rack.
Figure 18:
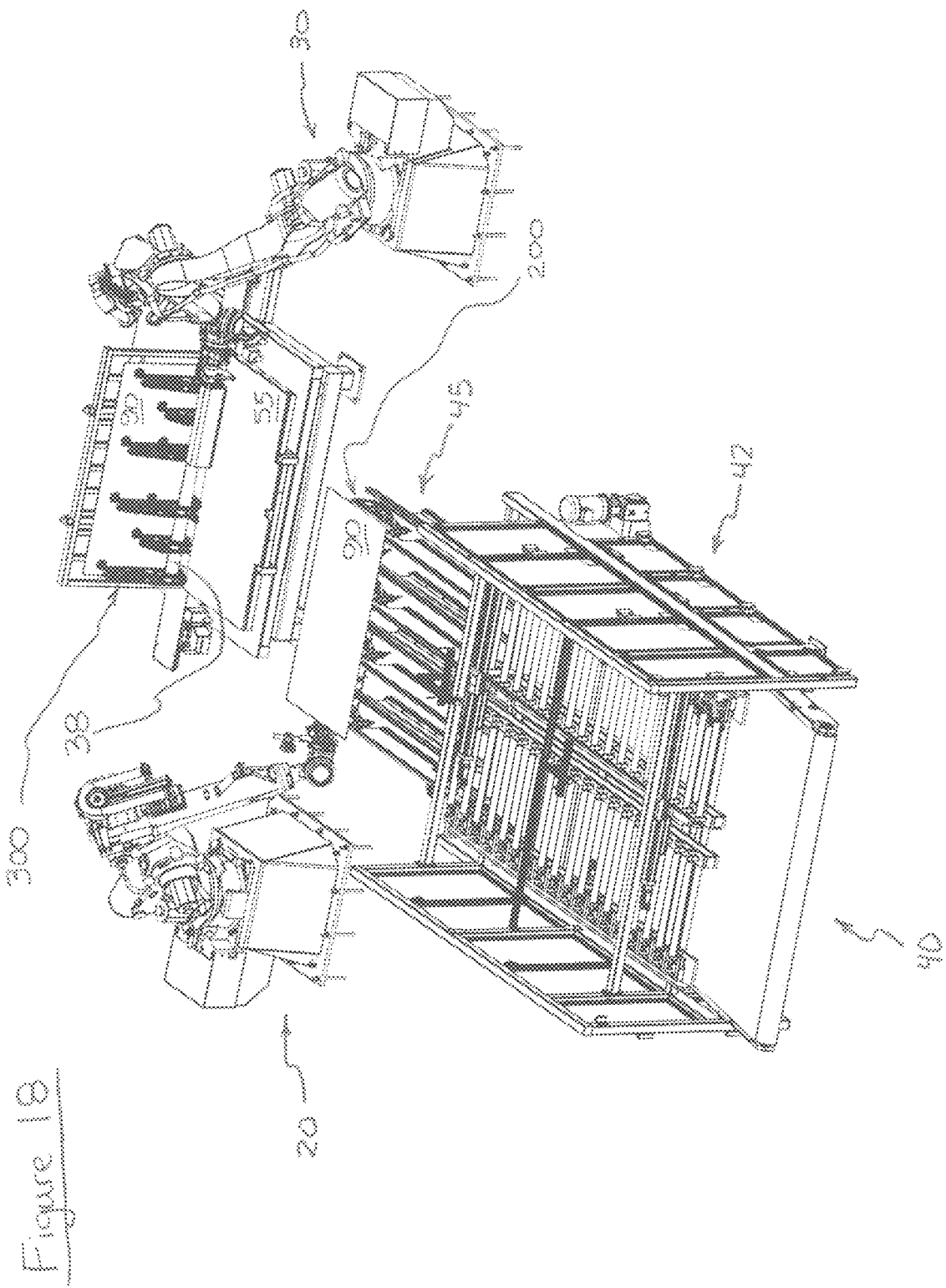
FIG. 18 is a perspective view of a robotic sheet stacking system in accordance with still another embodiment of the invention, showing first and second robot arms equipped respectively with first and second non-rotate-tool suction frames.
Figure 19:
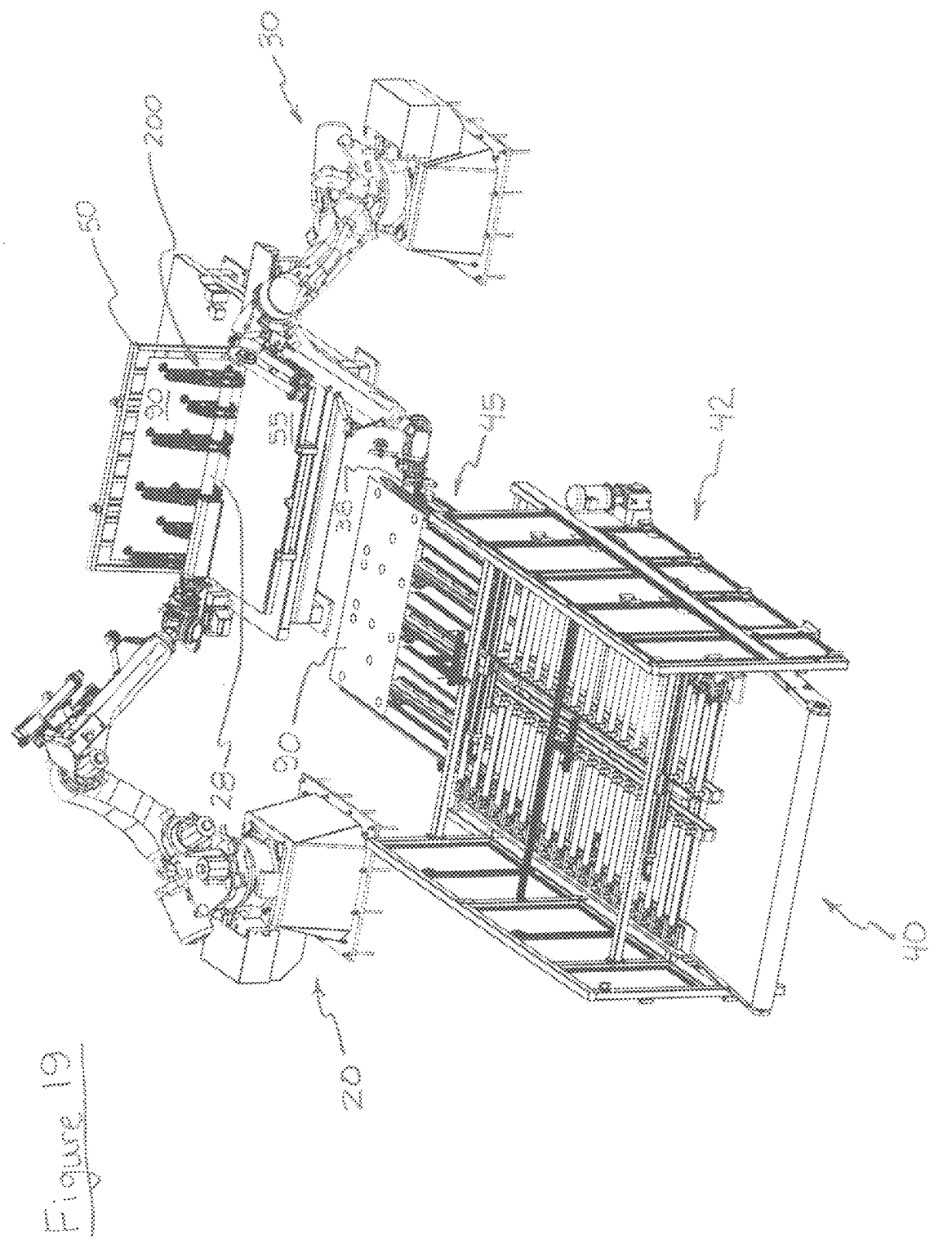
FIG. 19 is another perspective view of the robotic sheet stacking system of FIG. 18, showing the first robot arm loading a sheet onto a rack while a second robot arm prepares to lift a different sheet off an end region of a conveyor line of the system.
Figure 20:
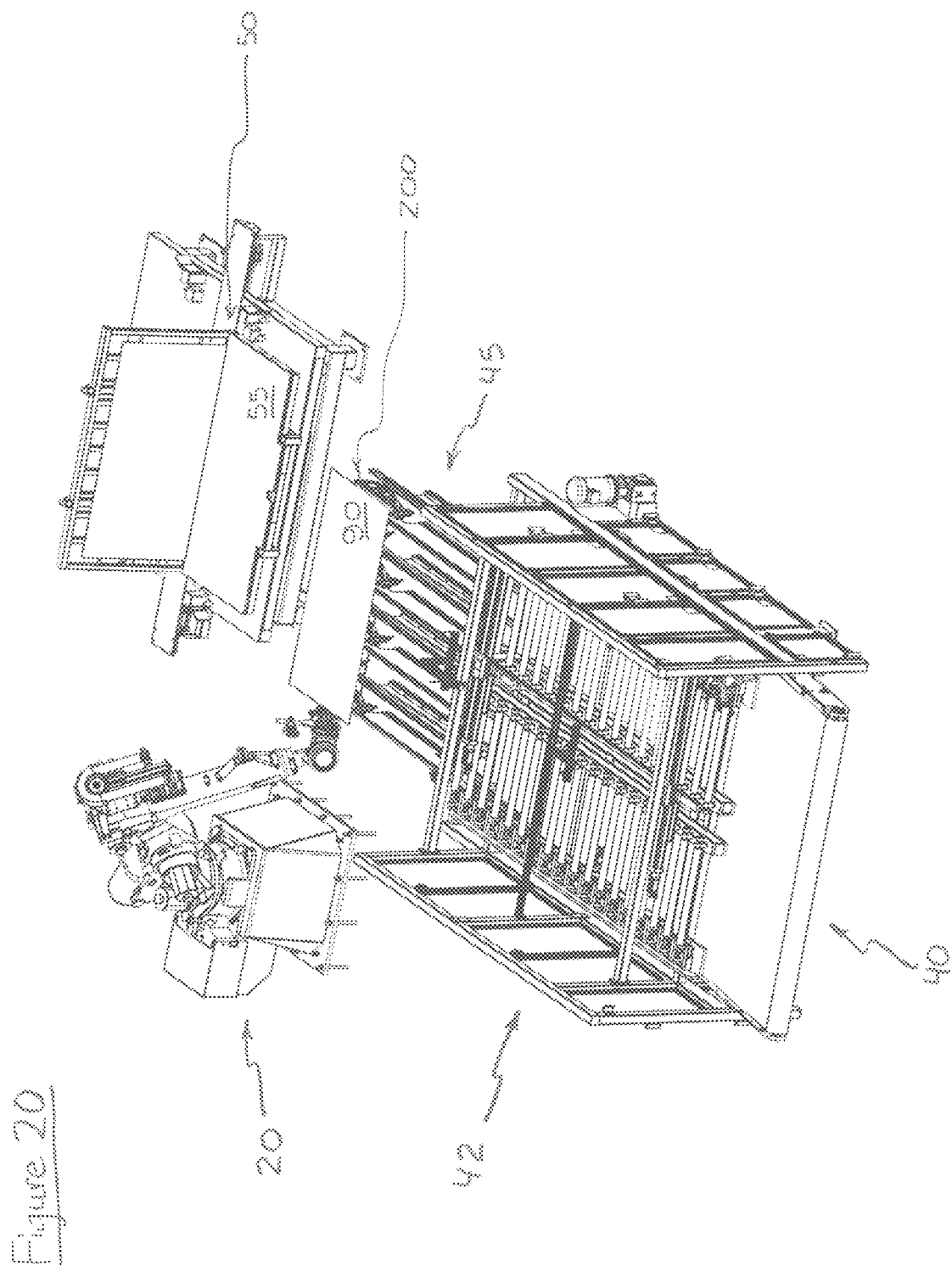
FIG. 20 is a perspective view of a robotic sheet stacking system in accordance with still another embodiment of the invention, showing a single robot arm that is equipped with a non-rotate-tool suction frame.
Figure 21:
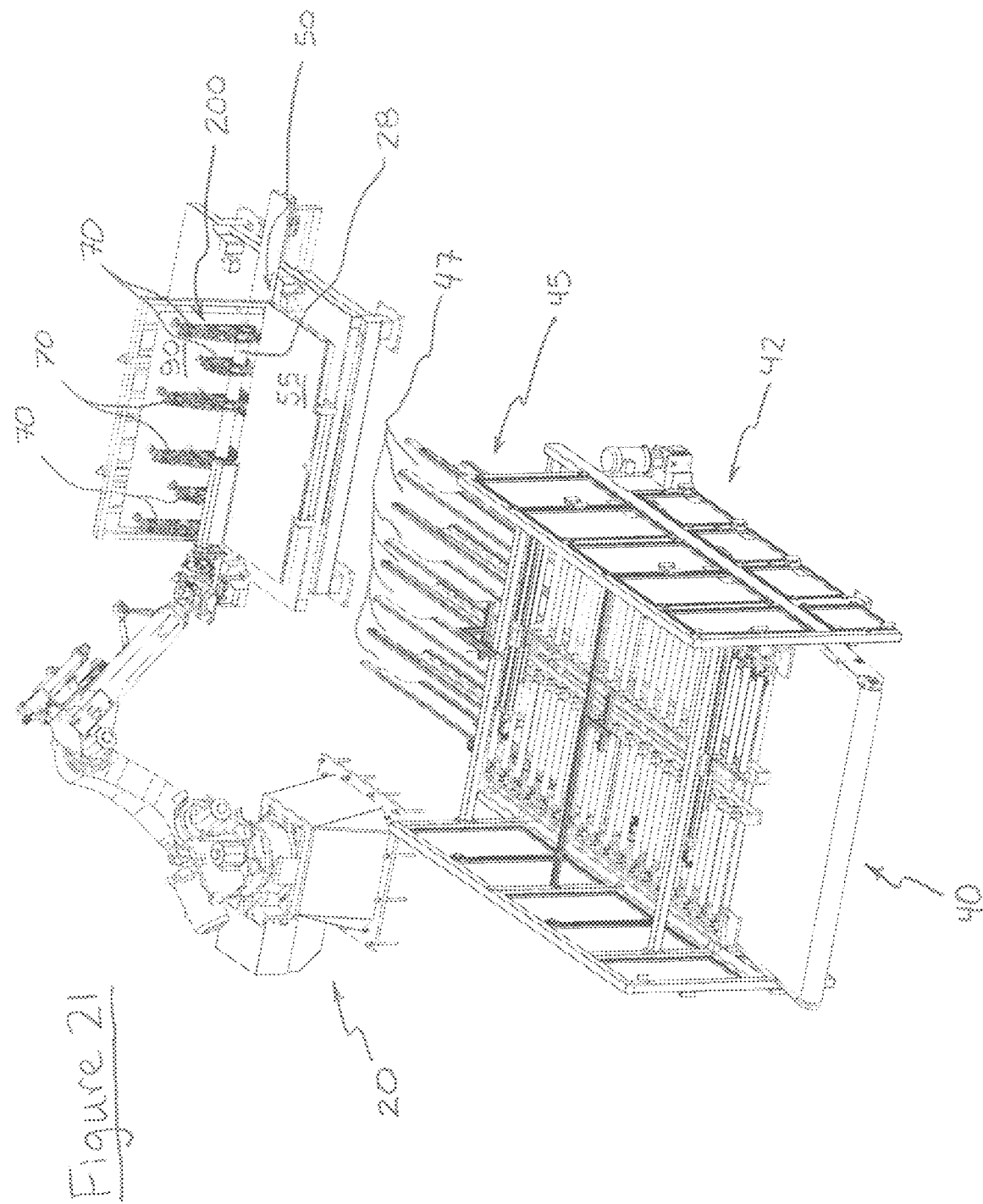
FIG. 21 is another perspective view of the robotic sheet stacking system of FIG. 20, showing the robot arm loading a sheet onto a rack.

Reference is made to the non-limiting example of FIGS. 12A and 12B. The suction cups in FIG. 12B are shown in the retracted position, whereas in FIG. 12A they are shown in the extended position. If desired, each suction cup can be configured to be extended independently of the others. In such cases, any desired group of suction cups on a given suction frame 200, 300 can be extended while the other suction cups on the suction frame can be left in the retracted position. This, however, is not required. Instead, the suction cups on a given suction frame 200, 300 can be configured such that they must all be extended simultaneously. Skilled artisans will appreciate that other variants of this nature are possible, such as configuring all the suction cups on a given frame member 70 to be extended simultaneously.

Extendable/retractable suction cups can facilitate grabbing the underside of one or more sheets 90 resting on the end region 45 of the conveyor line 40. When a desired one of the robot arms 20, 30 is positioned such that its free end region 28, 38 is adjacent the end region 45 of the conveyor line 40, the respective suction frame 200, 300 can be positioned such that the suction cups on that suction frame, when in the extended position, engage the underside of such sheet(s) 90. In other embodiments, the suction cups are not extendable/retractable, and are engaged with the underside of such sheet(s) 90 solely by moving the respective suction frame 200, 300 relative to the conveyor line end region 45.

The number of suction cups or other suction devices on each frame member 70 can be varied. In the embodiments illustrated, there are at least 10 (e.g., 14) suctions cups on each suction frame, although this is by no means required.

In the embodiments illustrated, the first suction frame 200 can be positioned so as to be received in (e.g., project upwardly through) a plurality of longitudinal gaps 47 between individual conveyors (e.g., individual conveyor belts) of the conveyor line end region 45 so as to engage (via the suction cups or other suction devices on the first suction frame) one or more sheets on the conveyor line. Similarly, the second suction frame 300 can (subsequently) be positioned as to be received in a plurality of longitudinal gaps 47 between individual conveyors of the conveyor line end region 45 so as to engage one or more other sheets on the conveyor line.

The longitudinal gaps 47 between individual conveyors of the conveyor end region 45 are perhaps best shown in FIG. 1. Here, it can be appreciated that these gaps 47 extend in a longitudinal direction, e.g., parallel to the path of substrate travel along the conveyor line end region 45. Thus, the frame members 70 of a given suction frame 200, 300, when received in a plurality of such longitudinal gaps 47, extend in a longitudinal direction. This is in contrast with systems where the arms of a suction frame extend laterally/crosswise to the path of substrate travel. As shown in FIGS. 1-11, the longitudinal gaps 47 open through the downstream end of the conveyor end region 45 (i.e., are open in a longitudinal downstream direction). Thus, when a given suction frame 200, 300 is received in a plurality of such longitudinal gaps 47, that suction frame projects (in an upstream direction) through the downstream end of the conveyor end region 45. This preferred arrangement is in contrast with having a suction frame project into a conveyor section from lateral openings in the side of a conveyor line.

In the embodiments illustrated, the longitudinal gaps 47 are located between laterally spaced-apart arms (e.g., beams) of the conveyor line end region 45. Each of these arms preferably is cantilevered. The illustrated arms extend in a longitudinal direction, e.g., parallel to the path of substrate travel of the conveyor line end region. Preferably, mounted on these arms are respective conveyor belts. In the embodiments illustrated, there are eight such arms. The number of arms and conveyor belts, however, can be varied. Moreover, if desired, the arms can be mounted to the floor (e.g., via a frame or other base), rather than being cantilevered.

With continued reference to FIG. 1, this figure is a top view of a non-limiting example of the robotic sheet stacking system 10. Here, the system 10 comprises a glass stacking station 15. As shown, the glass stacking station 15 preferably is enclosed (e.g., about its perimeter) by a safety shield 29, such as Plexiglas windows, to create a guarded, stacking zone. In such cases, the path of substrate travel preferably passes through (e.g., glass sheets preferably are transported through) an opening in (e.g., a gap between two portions of) the enclosure. Within the illustrated enclosure, two robot arms 20, 30 are positioned adjacent a distal end of the conveyor line 40. While an enclosure 29 is preferred for safety purposes, it is not required for the robotic sheet stacking system 10 to function. Thus, the enclosure 29 may be omitted in some embodiments.

As noted above, the system 10 includes a storage rack 50. The storage rack 50 preferably is configured to retain a stack of sheets 90 in a vertical-offset position. Thus, the illustrated rack 50 has a generally horizontal base 55 and a generally vertical back wall. The rack can be a conventional glass rack. Its back wall may be angled back from vertical by a few degrees, and its base 55 may be angled up from horizontal by a corresponding amount, as is well-known to skilled artisans.

The system 10 has a controller 63 configured to move the first 20 and second 30 robot arms in a sequentially alternating unloading operation. The sequentially alternating unloading operation includes: (i) the first robot arm 20 unloading one or more sheets from the conveyor line 40, and subsequently (ii) the second robot arm 30 unloading one or more other sheets from the conveyor line. This sequence of steps (i) and (ii) may be repeated as many times as necessary to unload the desired number of sheets from the conveyor line 40. Moreover, it will be understood, of course, that the sequentially alternating unloading operation may begin with the second robot arm 30 unloading sheets, rather than starting with the first robot arm 20 unloading sheets.

In preferred embodiments, the system 10 includes a robot controller 63 and a main controller (e.g., PLC controller) 66. Reference is made to FIG. 1. Here, the illustrated robot controller 63 is shown as a top view of two stacked robot controllers. More information on one example of a non-limiting controller set-up is provided later in this disclosure.

In more detail, the sequentially alternating unloading operation preferably includes: (a) the first robot arm 20 (e.g., the free end 28 thereof, and the first suction frame 200) moving toward a rack 50 (e.g., and carrying one or more sheets 90) while the second robot arm 30 (e.g., the free end 38 thereof, and the second suction frame 300) is moving toward the end region 45 of the conveyor line 40 (e.g., while unloaded), and subsequently (b) the second robot arm (e.g., the free end thereof, and the second suction frame) moving toward the rack (e.g., and carrying one or more other sheets) while the first robot arm (e.g., the free end thereof, and the first suction frame) is moving toward the end region of the conveyor line (e.g., while unloaded). This sequence of steps (a) and (b) may be repeated as many times as necessary to unload the desired number of sheets from the conveyor line 40.

Thus, the robotic sheet stacking system 10 preferably has a first position (see FIGS. 2 and 9) in which the first robot arm 20 is elevated and has the first suction frame 200 loaded with one or more sheets 90 while the second robot arm 30 is lowered and has the second suction frame 300 unloaded, and such that the system has a second position (see FIGS. 3 and 4) in which the second robot arm 30 is elevated and has the second suction frame 300 loaded with one or more sheets 90 while the first robot arm 20 is lowered and has the first suction frame 200 unloaded. Preferably, when the system 10 is in the first position (or at least for part of the time when the system is in the first position), the first suction frame 20 is above (i.e., at a higher elevation than) the second suction frame 30, and when the system is in the second position (or at least for part of the time when the system is in the second position), the second suction frame 30 is above the first suction frame 20. This can be appreciated, for example, by comparing FIGS. 2 and 9 with FIGS. 3 and 4.

The system 10 preferably also has a third position (see FIG. 5) in which the first robot arm 20 is adjacent a storage rack 50 and has the first suction frame 200 loaded with one or more sheets 90 while the second robot arm 30 is adjacent the conveyor line 40 and has the second suction frame 30 unloaded. In such cases, for at least some of the time when the system 10 is in the third position, the first suction frame 200 preferably is at a higher elevation than the second suction frame 300.

In addition, the system 10 preferably has a fourth position (see FIGS. 6-8) in which the second robot arm 30 is adjacent the storage rack 50 and has the second suction frame 300 loaded with one or more sheets 90 while the first robot arm 20 is adjacent the conveyor line 40 and has the first suction frame 200 unloaded. In such cases, for at least some of the time when the system 10 is in the fourth position, the second suction frame 300 preferably is at a higher elevation than the first suction frame 200.

In the present embodiment group, the conveyor line 40 is a single conveyor line and the controller is configured such that both the first 20 and second 30 robot arms remove sheets 90 from the single conveyor line (i.e., during the sequentially alternating unloading operation). It is to be appreciated, however, that the single conveyor line 40 may have multiple conveyance lanes. For example, in FIGS. 5, 6, 8, and 11 the illustrated sheets 90 are being conveyed along a central lane of the conveyor line 40, whereas in FIG. 7 the illustrated sheets are being conveyed along a left-side lane of the conveyor line, while in FIG. 10 the illustrated sheets are being conveyed along a right-side lane of the conveyor line. Furthermore, the conveyor line 40 can optionally comprise two or more conveyance lanes that extend alongside (e.g., are parallel to) one another but are physically spaced apart or otherwise separated.

Preferably, the end region 45 of the conveyor line 40 is cantilevered. This allows first 200 and second 300 suction frames to be sequentially moved beneath the end of the conveyor line 40 to facilitate removing sheets 90 from the conveyor line. Furthermore, it allows the suction frames 200, 300 to undergo rotation (e.g., about a vertical axis) when moving into position under the conveyor line end region 45. This can be convenient in terms of facilitating efficient movement paths for one or more robot arms 20, 30 relative to the conveyor line end region 45.

Figure 3:
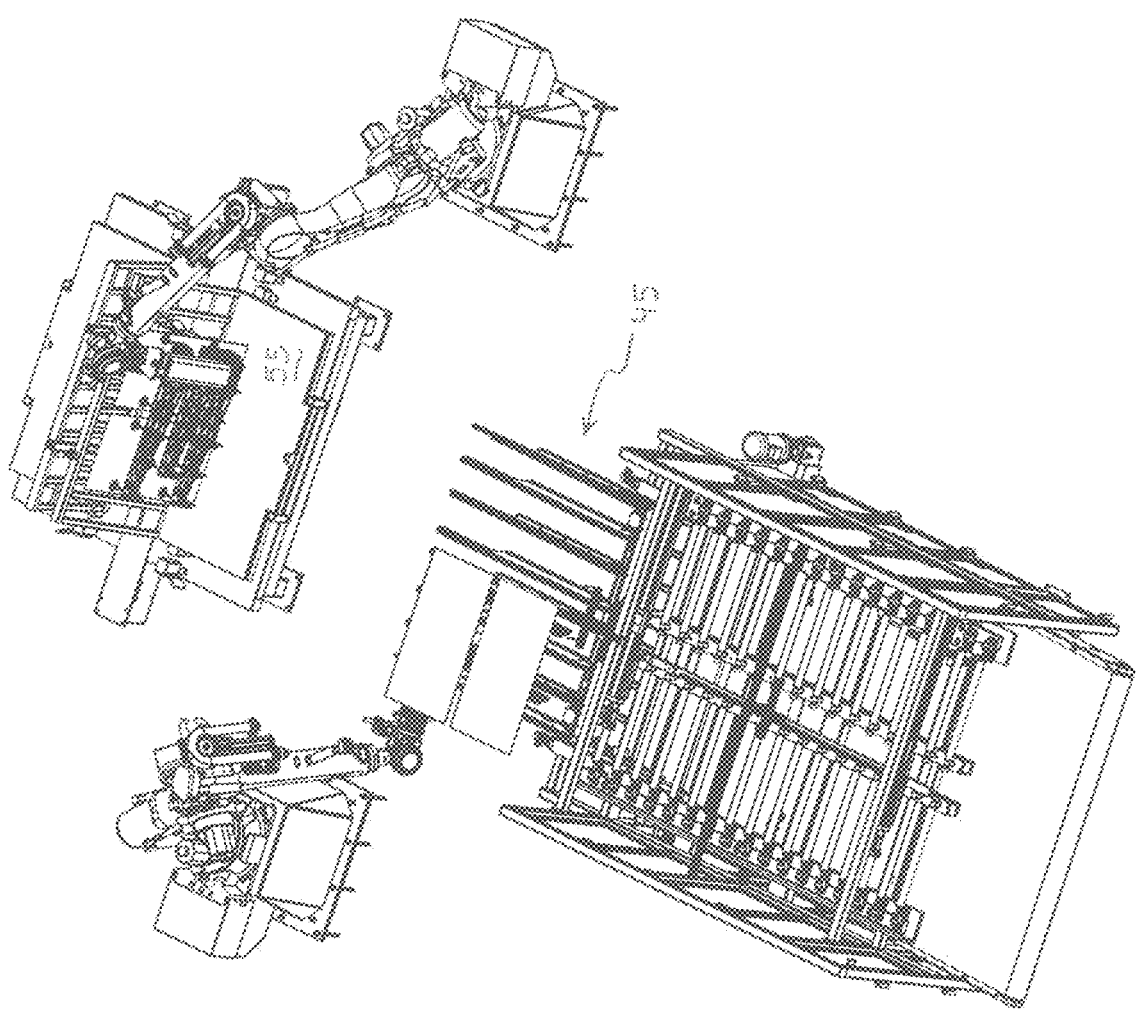
FIG. 3 is another perspective view of the robotic sheet stacking system of FIG. 2, showing a second robot arm transporting a pair of sheets.

As can be appreciated by referring to FIGS. 2 and 3, the illustrated conveyor line 40 preferably has an open area (e.g., an underpass) beneath its end region 45. This open area preferably is open in a downstream direction, e.g., such that first 200 and second 300 suction frames can be sequentially moved, in an upstream direction, into that open area. Preferably, the open area underneath the cantilevered end region of the conveyor line is open to the longitudinal gaps 47 in the cantilevered end region. In the embodiment illustrated, the open area beneath the conveyor line end region 45 is also laterally open (i.e., open on both lateral sides), although this is not required.

The end region 45 of the illustrated conveyor line 40 comprises a plurality of spaced-apart individual conveyors, e.g., individual conveyor belts. These individual conveyors (e.g., conveyor belts) preferably are mounted respectively on a plurality of cantilevered arms (e.g., cantilevered beams). The cantilevered arms are spaced-apart from one another laterally, such that the longitudinally elongated gaps 47 are located between (e.g., and bounded by) the cantilevered arms. The gaps 47 are sized to receive distal portions (which preferably account for more than 50% of the length) of the frame members 70. The illustrated gaps 47 are closed on their upstream ends while being open on their downstream ends.

The cantilevered arms preferably project longitudinally (e.g., so as to be generally parallel to each other) away from the adjacent upstream section 42 of the conveyor line 40. In the embodiment illustrated, the adjacent upstream section 42 of the conveyor line 40 includes a frame or base mounted to the floor. Thus, the cantilevered end region 45 of the illustrated conveyor line 40 projects longitudinally away from the adjacent upstream conveyor section 42, which preferably has a frame or other base mounted to the floor. The illustrated upstream conveyor section 42 comprises a series of transport rollers, which are configured to rotate about horizontal axes oriented crosswise to the path of substrate travel along that conveyor section, while the illustrated cantilevered end region 45 comprises a plurality of laterally spaced-apart conveyor belts each having its length oriented parallel to the path of substrate travel along the cantilevered end region. Instead of having these individual conveyor belts, individual rollers (or roller pairs) could be mounted at longitudinally spaced-apart positions along each cantilevered arm.

Figure 5:
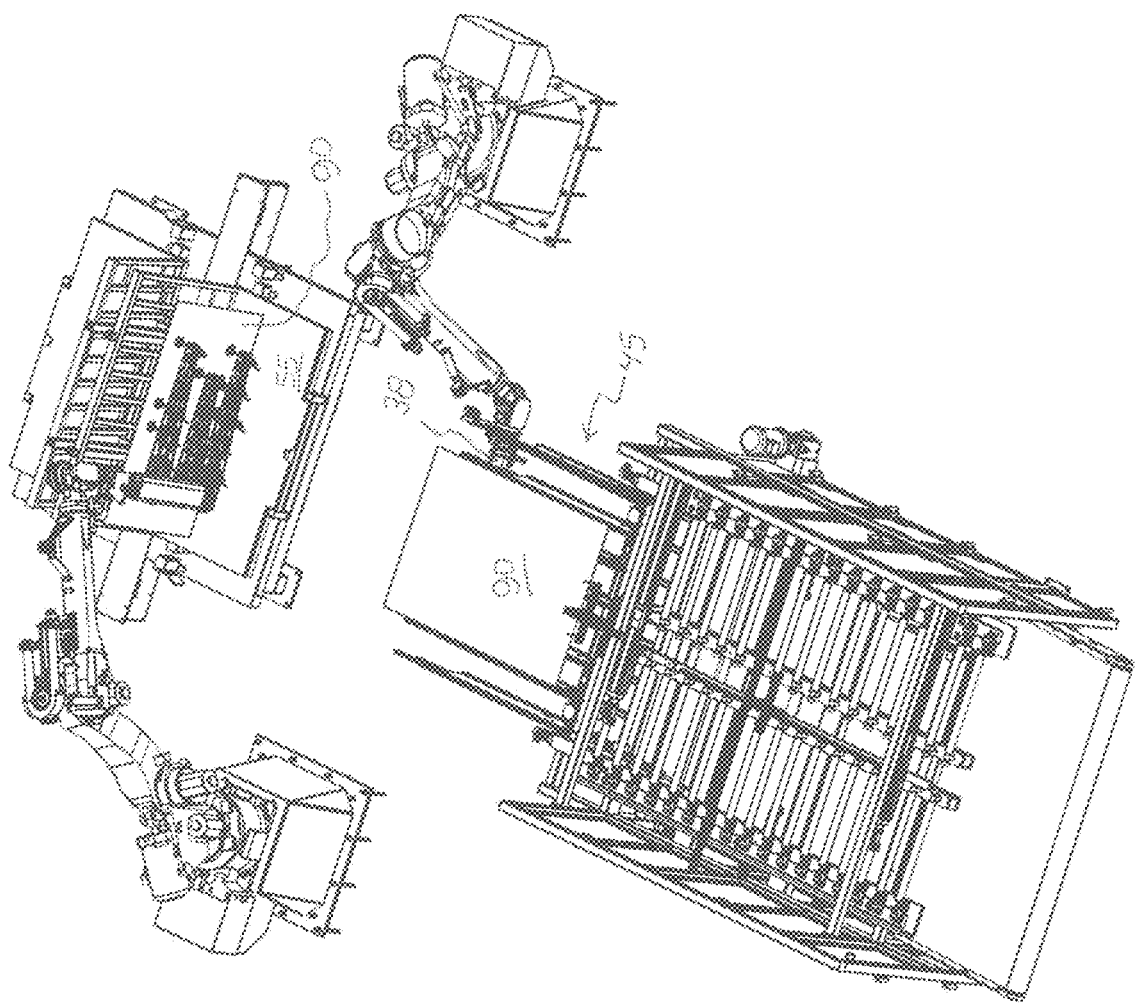
FIG. 5 is yet another perspective view of the robotic sheet stacking system of FIG. 2, showing a first robot arm loading a single sheet onto a rack while a second robot arm prepares to lift a second sheet off an end region of a conveyor line.
Figure 6:
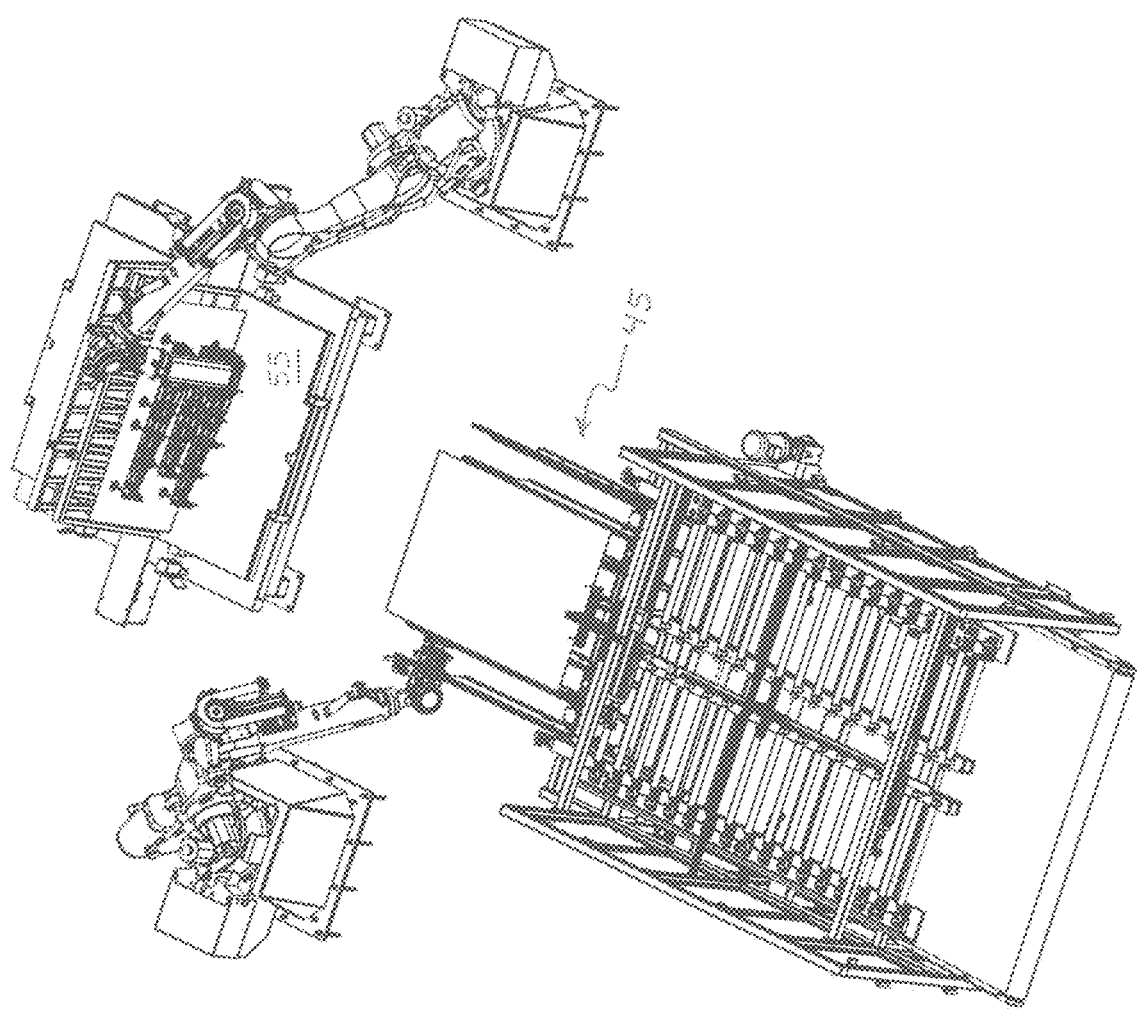
FIG. 6 is still another perspective view of the robotic sheet stacking system of FIG. 2, showing a first robot arm preparing to lift a single sheet off an end region of a conveyor line while a second robot arm is loading a single sheet onto a rack.
Figure 8:
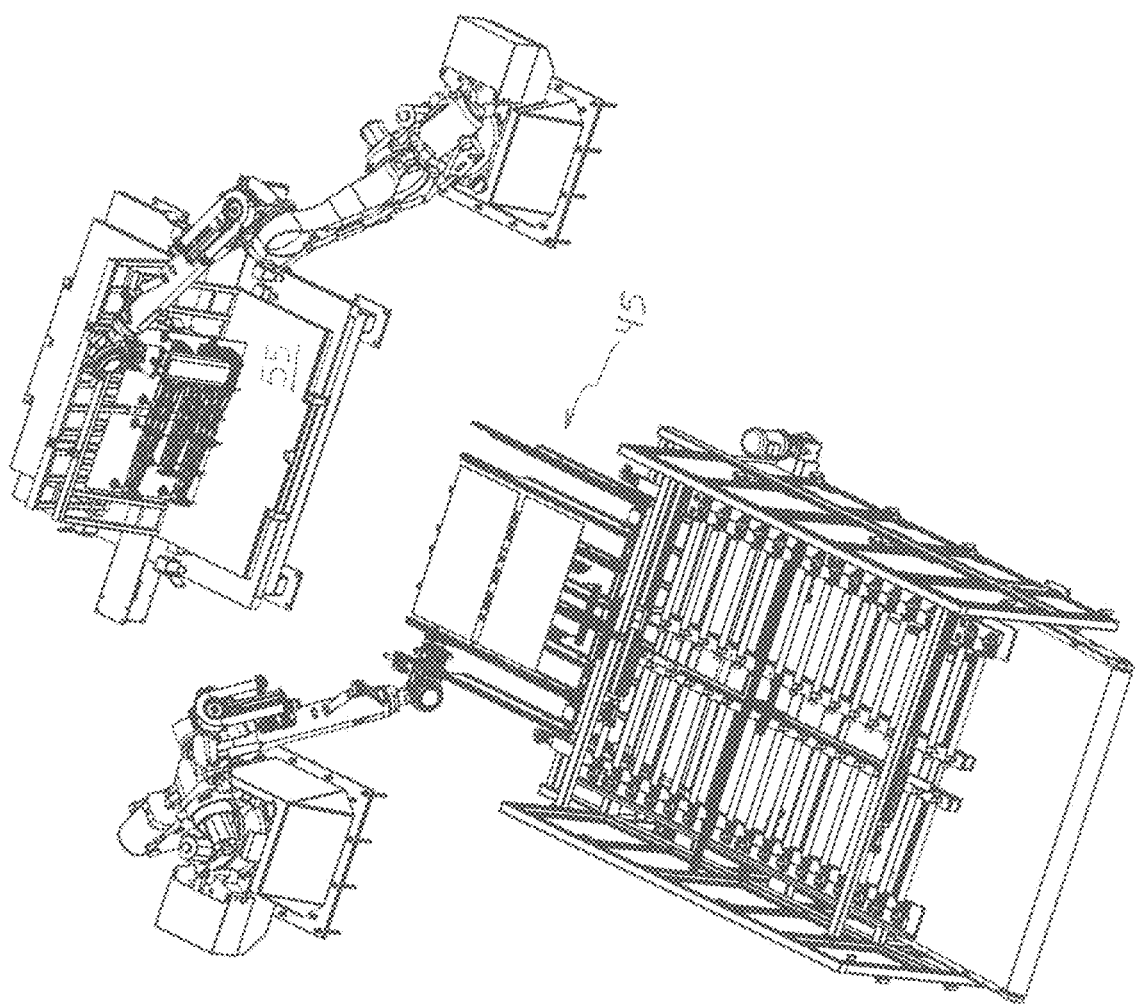
FIG. 8 is still another perspective view of the robotic sheet stacking system of FIG. 2, showing a first robot arm preparing to lift a pair of sheets off an end region of a conveyor line while a second robot arm is loading a pair of sheets onto a rack.
Figure 9:
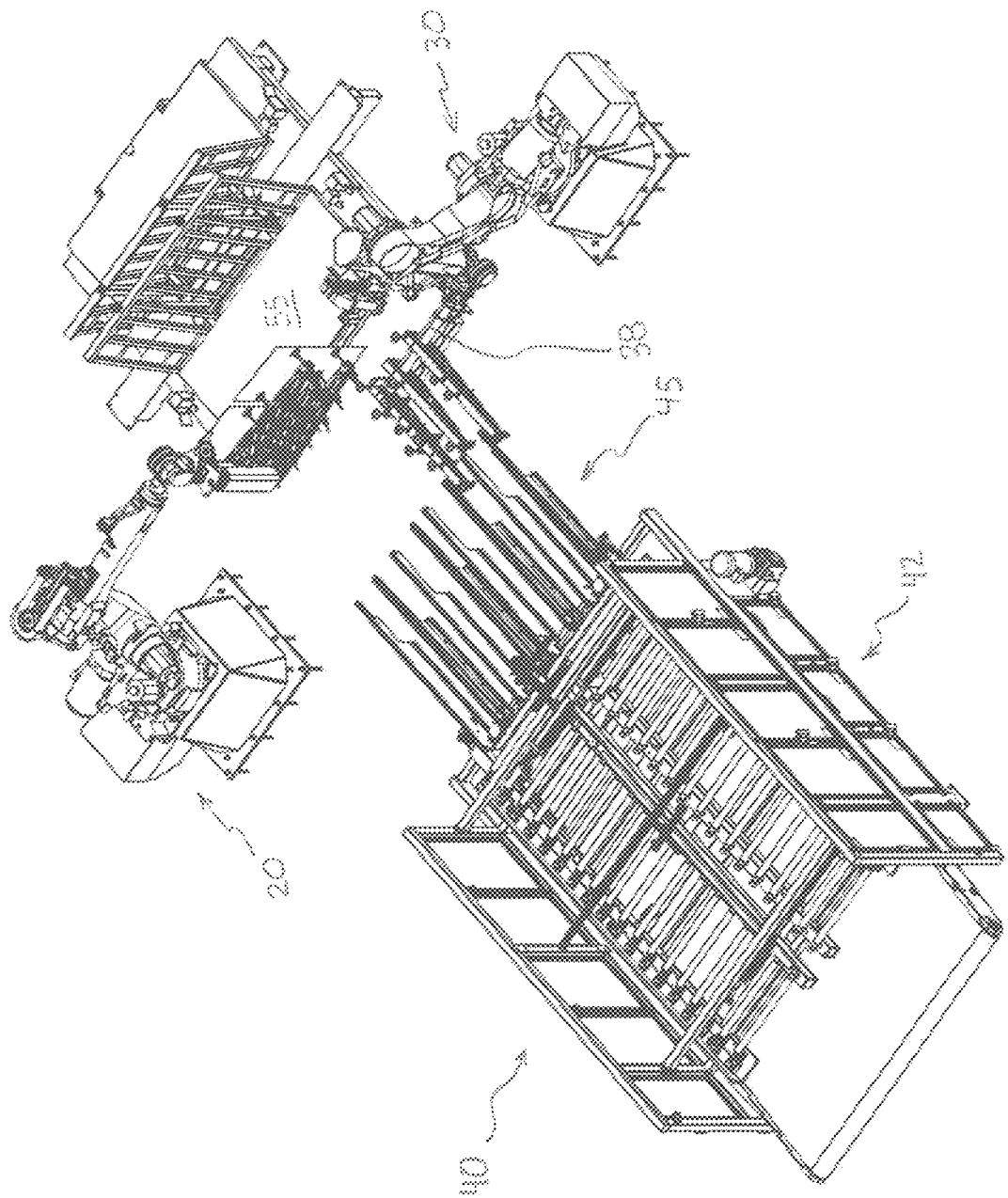
FIG. 9 is yet another perspective view of the robotic sheet stacking system of FIG. 2, showing a first robot arm transporting a pair of sheets.
Figure 10:
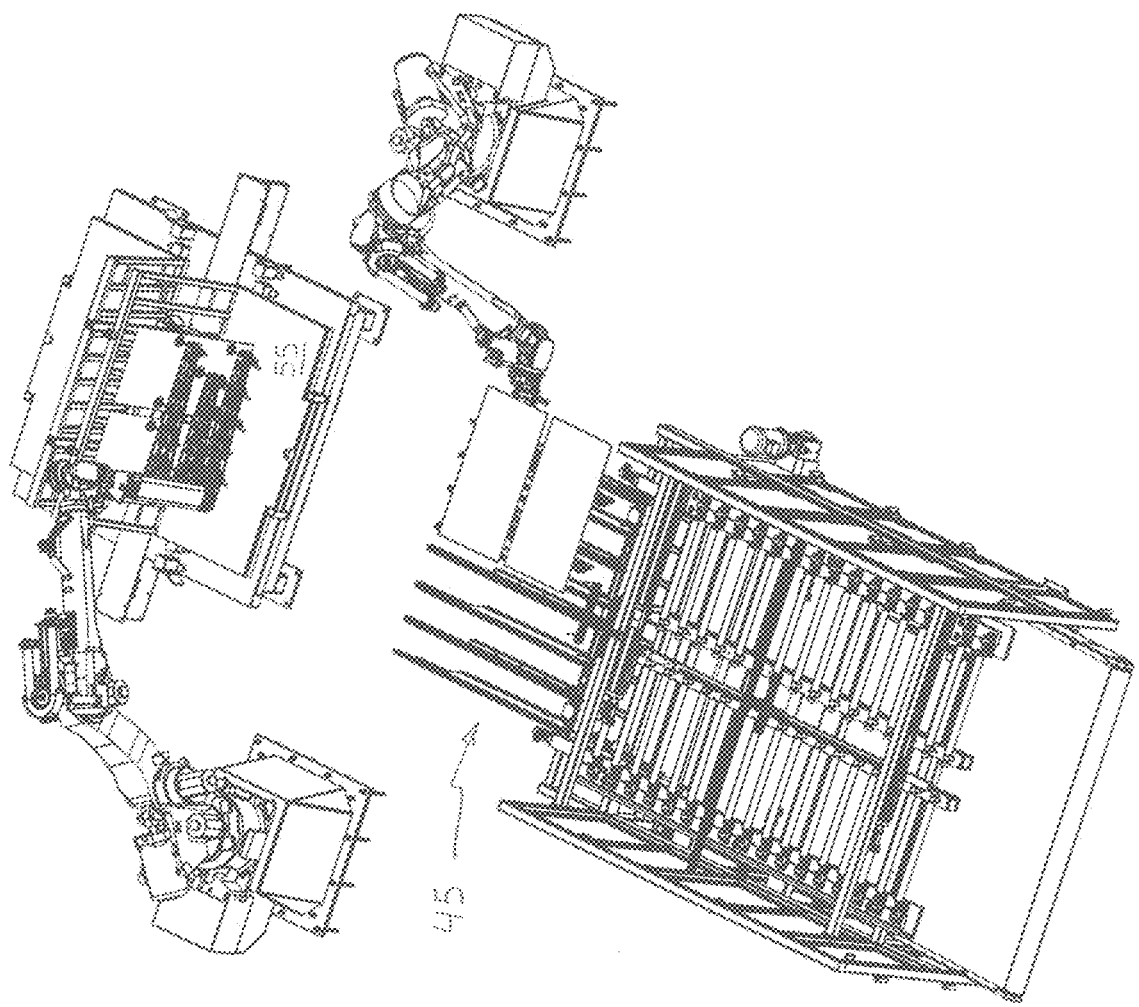
FIG. 10 is still another perspective view of the robotic sheet stacking system of FIG. 2, showing a first robot arm loading a pair of sheets onto a rack while a second robot arm prepares to lift a pair of sheets off an end region of a conveyor line.
Figure 11:
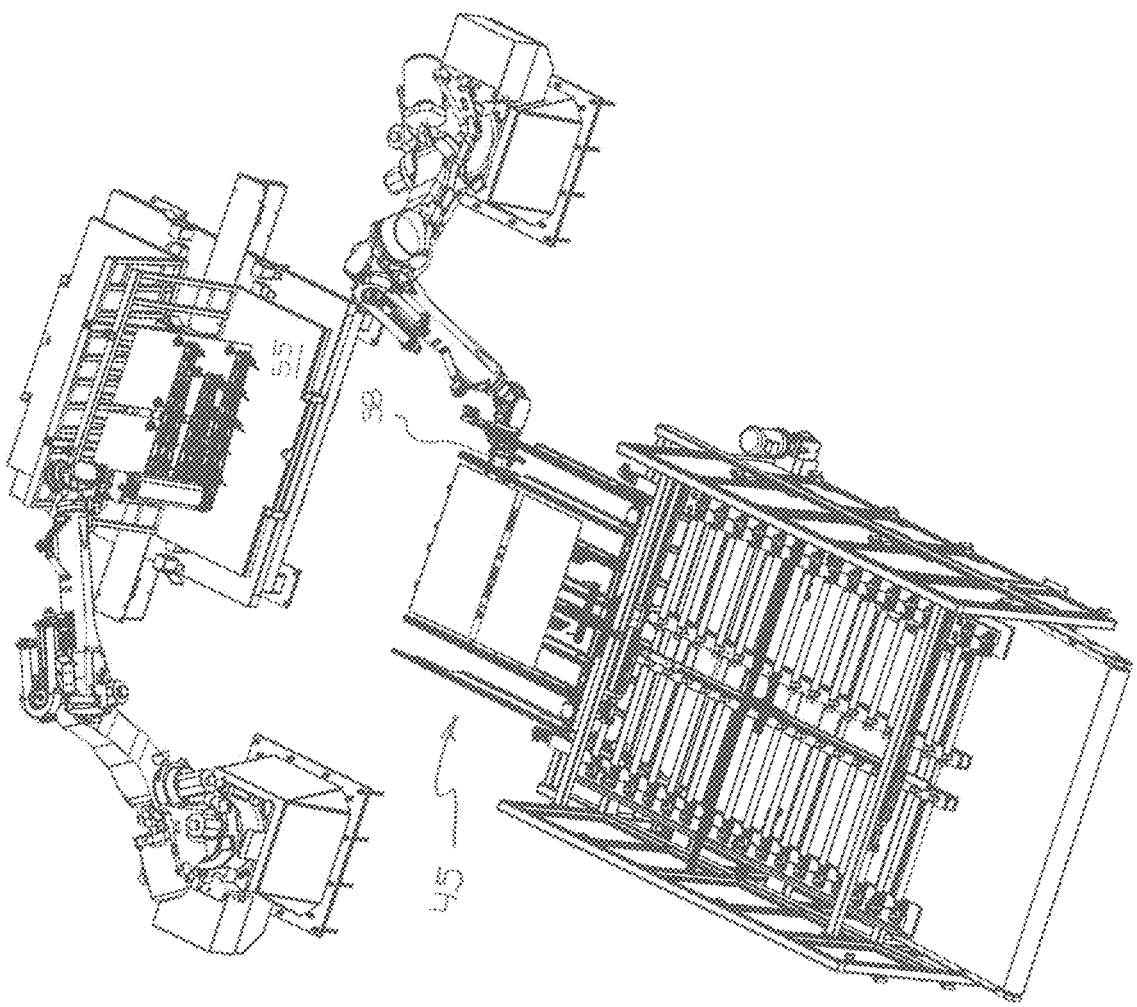
FIG. 11 is yet another perspective view of the robotic sheet stacking system of FIG. 2, showing a first robot arm loading a pair of sheets onto a rack while a second robot arm prepares to lift a pair of sheets off an end region of a conveyor line.

In more detail, the illustrated conveyor line 40 has a cantilevered end region 45, the system 10 has a first approach configuration in which the first suction frame 200 is beneath the cantilevered end region of the conveyer line, and the system also has a second approach configuration in which the second suction frame 300 is beneath the cantilevered end region of the conveyor line. The first approach configuration is shown in FIGS. 6-8, while the second approach configuration is shown in FIGS. 5, 10, and 11.

Further, the system 10 preferably has a first picking configuration in which an end region 28 of the first robot arm 20 extends crosswise below (optionally directly below) the cantilevered end region 45, such that the first suction frame 200 (e.g., including suction cups thereof) projects upwardly through a plurality of longitudinal gaps 47 between individual conveyors of the cantilevered end region so as to engage one or more sheets 90 on the conveyor line 40. It is to be appreciated, with reference to FIGS. 6-8, that the first suction frame 200 (or just a plurality of suction cups thereof) may simply move upwardly when going from the first approach configuration to the first picking configuration. When the system is in the first picking configuration, the suction cups or other suction devices of the first suction frame are in contact with the bottom major surface(s) of one or more sheets on the conveyor line.

Still further, the system 10 preferably has a second picking configuration in which an end region 38 of the second robot arm 30 extends crosswise below (optionally directly below) the cantilevered end region 45, such that the second suction frame 300 (e.g., including suction cups thereof) projects upwardly through a plurality of longitudinal gaps 47 between individual conveyors of the cantilevered end region so as to engage one or more sheets 90 on the conveyor line 40. It is to be appreciated, with reference to FIGS. 5, 10, and 11, that the second suction frame 300 (or just a plurality of suction cups thereof) may simply move upwardly in going from the second approach configuration to the second picking configuration. When the system is in the second picking configuration, the suction cups or other suction devices of the second suction frame are in contact with the bottom major surface(s) of one or more sheets on the conveyor line.

In some embodiments, the present system 10 (e.g., each of one or two robot arms 20, 30) is configured to rotate (and the present methods rotate) one or more sheets 90 about two more axes during a stacking operation. For example, each sheet 90 may start in a horizontal orientation on the conveyor line 40 and end-up in an upright (e.g., vertical or generally vertical) orientation on the storage rack 50. In such cases, the result of the stacking operation is that each sheet is effectively rotated about a horizontal axis. In addition, after one or more sheets 90 are lifted off the conveyor line 40 by a given suction frame 200, 300, the system may also effectively rotate the resulting sheet load (i.e., the sheet or sheets carried by the suction frame) about a vertical axis.

In more detail, certain embodiments of the present system 10 are configured to remove (and in certain embodiments of the present methods remove) one or more sheets 90 from the conveyor line 40 and then perform a quarter-turn operation on such sheet(s) before placing it/them onto the rack 50. The term "quarter-turn operation," as used herein, refers to such one or more sheets when picked off the conveyor line each initially having one of four edges facing the downstream direction and yet when such sheet(s) are placed onto the rack, the edge (of each such sheet) that is set on the rack base (i.e., the rack floor or other horizontal bottom support) is one of the two edges that are contiguous to the edge that was initially facing the downstream direction on the conveyor line. Preferably, the result of such stacking operation is that each such sheet is effectively rotated: (i) by about 90 degrees about a vertical axis, and (ii) by 80-100 degrees about a horizontal axis.

Thus, the system 10 preferably has a first loaded configuration in which the first suction frame 200 retains one or more sheets (in some cases, two sheets) 90 in a first rotational position adjacent the conveyor line 40, and the system has a second loaded configuration wherein the first suction frame retains the same one or more sheets in a second rotational position adjacent a storage rack 50. In some cases, such sheet(s) are effectively offset rotationally by about 90 degrees, relative to a vertical axis, when in the second rotational position as compared with the first rotational position. In more detail, such sheet(s) preferably are effectively offset rotationally about multiple axes when in the second rotational position as compared with the first rotational position. This can be appreciated by referring to FIGS. 7, 8, 10, and 11.

In some embodiments, two sheets are transported in each suction frame load. In certain embodiments of this nature, when the system 10 is in the first loaded configuration, the two loaded sheets 90 are spaced apart from each other along a longitudinal axis of the conveyor line 40, whereas when the system is in the second loaded position, those two sheets 90 are side-by-side such that two bottom edges of those two sheets are substantially flush with each other and substantially equidistant from a bottom wall (or other bottom support) of the adjacent rack 50.

The invention also provides methods of using a robotic sheet stacking system 10 to stack sheets 90. In one group of the present methods, the system 10 includes first 20 and second 30 robot arms and a conveyor line 40. The method involves conveying a plurality of sheets (e.g., glass sheets) 90 along the conveyor line 40 and moving the first 20 and second 30 robot arms in a sequentially alternating unloading operation, such that the system 10 has a first position in which the first robot arm 20 is elevated and has the first suction frame 200 loaded with one or more sheets 90 while the second robot arm 30 is lowered and has the second suction frame 300 unloaded, and such that the system has a second position in which the second robot arm is elevated and has the second suction frame loaded with one or more sheets while the first robot arm is lowered and has the first suction frame unloaded.

The present methods are advantageous for removing a plurality of sheets 90 from a conveyor line 40 and stacking them on a storage rack 50. The first 20 and second 30 robot arms and the conveyor line 40 can be of the nature described above with respect to the system/apparatus embodiments. Thus, the first robot arm 20 is equipped with a first suction frame 200 while the second robot arm 30 is equipped with a second suction frame 300.

In the present methods, the conveyance step preferably involves conveying the sheets 90 along the conveyor line 40 such that the sheets are retained in a horizontal (or at least generally horizontal) position during such conveyance. Furthermore, the conveyance step preferably includes conveying the sheets 90 along the end region 45 of the conveyor line 40. As can be appreciated by referring to FIGS. 1-11, such conveyance preferably involves conveying the sheets 90 in a longitudinal direction, e.g., along a path of substrate travel of the conveyor line end region 45.

In more detail, the conveyance step preferably includes conveying one or more sheets 90 along an adjacent upstream section 42 of the conveyor 40 and thereafter conveying such sheet(s) along the conveyor line end region 45. As connoted above, such sheet(s) 90 may: (a) travel on a plurality of transverse transport rollers when being conveyed along the adjacent upstream conveyor section 42, and thereafter (b) travel on a plurality of longitudinal conveyors (e.g., longitudinal conveyor belts) when being conveyed along the conveyor line end region 45.

The present methods preferably include stopping the conveyance of one or more sheets 90 along the conveyor line end region 45 prior to lifting such sheet(s) off the conveyor line using one of the robot arms 20, 30. Thus, when the suction cups or other suction devices of a given suction frame 200, 300 engage the bottom of one or more sheets on the conveyor line end region 45, such sheet(s) preferably are resting in a stationary configuration on the conveyor line end region.

The sequentially alternating unloading operation preferably is performed such that: (i) the first suction frame 200 is above (i.e., at a higher elevation than) the second suction frame 300 during at least some of the time when the system is in the first position, and (ii) the second suction frame 300 is above the first suction frame 200 during at least some of the time when the system is in the second position. As can be appreciated by referring to FIGS. 1-11, the present methods can involve one of the robot arms moving along an upper motion path toward the rack 50 while (e.g., simultaneously) the other robot arm moves along a lower motion path toward the end region 45 of the conveyor line 40. Thus, when a given robot arm 20, 30 is moving from the conveyor line 40 to the rack 50, that robot arm can travel along an upper motion path while the other robot arm travels along a lower motion path in moving from the rack to the end region 45 of the conveyor line 40.

Further, the sequentially alternating unloading operation preferably is performed such that the system 10 also has a third position in which the first robot arm 20 is adjacent the rack 50 and has the first suction frame 200 loaded with one or more sheets 90 while the second robot arm 30 is adjacent the conveyor line 40 and has the second suction frame 300 unloaded. Preferably, during at least some of the time when the system 10 is in the third position, the first suction frame 200 is at a higher elevation than the second suction frame 300.

Similarly, the sequentially alternating unloading operation preferably is performed such that the system 10 also has a fourth position in which the second robot arm 30 is adjacent the rack 50 and has the second suction frame 300 loaded with one or more sheets 90 while the first robot arm 20 is adjacent the conveyor line 40 and has the first suction frame 200 unloaded. Preferably, during at least some of the time when the system 10 is in the fourth position, the second suction frame 300 is at a higher elevation than the first suction frame 200.

In certain preferred embodiments of the present methods, the conveyor line 40 is a single conveyor line and the sequentially alternating unloading operation is performed such that both the first 20 and second 30 robot arms remove sheets 90 from the single conveyor line. The method preferably includes: (i) a first of the two robot arms moving to the conveyor line end region, lifting one or more sheets off the conveyor line end region, carrying such sheet(s) toward a storage rack, and placing such sheet(s) onto the storage rack, and (ii) a second of the two robot arms moving to the conveyor line end region, lifting one or more sheets off the conveyor line end region, carrying those sheet(s) toward the storage rack, and placing those sheet(s) onto the storage rack. Furthermore, steps (i) and (ii) will typically be repeated as many times as necessary to stack the desired number of sheets on the storage rack.

The present methods can optionally include: (a) rotating the first suction frame 200 about a vertical axis while that frame is being moved underneath the conveyor line end region 45, and subsequently (b) rotating the second suction frame 300 about a vertical axis while that frame is being moved underneath the conveyor line end region.

Preferably, the conveyor line 40 has a cantilevered end region 45, and the sequentially alternating unloading operation is performed such that the system 10 has a first approach configuration in which the first suction frame 200 is beneath the cantilevered end region and the system has a second approach configuration in which the second suction frame 300 is beneath the cantilevered end region. Generally, when one of the suction frames 200, 300 is underneath (e.g., directly beneath) the conveyor line end region 45, the other suction frame is adjacent the storage rack 50.

Once a given suction frame 200, 300 is in an approach position beneath the cantilevered end region, the method preferably involves moving such frame upwardly until its suction cups or other suction devices engage one or more sheets on the cantilevered end region. In some cases, prior to such engagement, the method includes moving one or more suctions cups or other suction devices on such frame from a retracted position to an extended position. This, however, is by no means the case in all embodiments. The upward movement of a given suction frame 200, 300 includes such frame (e.g., distal portions of its frame members 70) moving upwardly through a plurality of longitudinally extending gaps 47 in the cantilevered end region.

In more detail, the sequentially alternating unloading operation preferably is performed such that the system 10 has a first picking configuration in which the free end region 28 of the first robot arm 20 extends crosswise below (i.e., at a lower elevation than) the cantilevered end region 45 such that the first suction frame 200 projects upwardly through a plurality of longitudinal gaps 47 between individual conveyors of the cantilevered end region so as to engage one or more sheets 90 on the conveyor line.

Similarly, the sequentially alternating unloading operation preferably is performed such that the system 10 also has a second picking configuration in which the free end region 38 of the second robot arm 30 extends crosswise below the cantilevered end region 45 such that the second suction frame 300 projects upwardly through a plurality of longitudinal gaps 47 between individual conveyors of the cantilevered end region so as to engage one or more sheets 90 on the conveyor line.

Furthermore, in certain embodiments, the sequentially alternating unloading operation is performed such that the system 10 has a first loaded configuration in which the first suction frame 200 retains one or more (in some cases, two) sheets 90 in a first rotational position adjacent the conveyor line 40, and the system has a second loaded configuration wherein the first suction frame retains such sheet(s) in a second rotational position adjacent a storage rack 50. In such embodiments, the so handled sheet(s) preferably are offset rotationally by 90 degrees when in the second rotational position as compared to the first rotational position. In certain methods where a pair of sheets is lifted by a given robot arm, the sequentially alternating unloading operation is performed such that when the system 10 is in the first loaded configuration, the two sheets are spaced apart from each other along a longitudinal axis of the conveyor line end region, and when the system is in the second loaded position, the two sheets are side-by-side such that two bottom edges of the two sheets are substantially flush with each other and substantially equidistant from a bottom wall 55 of an adjacent storage rack 50.

Preferably, the sequentially alternating unloading operation produces a stack of sheets (e.g., monolithic glass sheets) positioned on a rack 50 in a vertical-offset position.

One example of a suitable control set-up will now be described with reference to the non-limiting embodiment shown in FIG. 1. The packer station is controlled using an industrial controller 66 with integrated motion controller for controlling servo motor position, speed, and torque. This controller 66 manages sheets 90 on the horizontal conveyors, as in left, right or center lane designations. The controller 66 communicates sheet information, as in size orientation and lane, to the robot controllers 63 (reference number 63 in FIG. 1 refers to two stacked robot controllers), which control the two six-axis industrial robots 20, 30 shown in the embodiment of FIG. 1, e.g., via Ethernet/IP or similar control network. Rack 50 information, as in rack type, pack type, sheet size and count, is also communicated from main/plc controller 66 to robot controllers 63. The packer station also has a HMI for machine control functions as starting the packer, monitoring sheet data, and status information regarding the packer and the sheets 90 and racks 50 being processed. The HMI also provides visual aids, explanations, and remedies when faults occur during operation. The main controller 66 positions sheets 90 on the conveyor 40 to allow either robot 20, 30 to alternatingly pick and pack the sheets on the rack 50. Each robot 20, 30 is fitted with a tool (e.g., a suction frame) 200, 300 having vacuum cups for attaching and moving sheets 90. Each robot can optionally be provided in conjunction with a second tool (e.g., a second suction frame), which may be configured (e.g., may have vacuum cups arranged) to allow the robot to pick and pack sheets in an orientation perpendicular to that of the sheet orientation when using the first tool. In the embodiment of FIG. 1, each robot 20, 30 is provided in conjunction with optional automated tool changers 21, 31, each including a tool rack, to allow unattended tool (e.g., suction frame) changing. An Ethernet based pneumatic valve with integrated electronic input and outputs (I/O) is used to control actuations on the tool (e.g., suction frame) and monitor actuations as in feedback from pneumatic actuators, sheet position relative to the tool. Each tool (e.g., suction frame) 200, 300 preferably is fitted with displacement sensors to allow the robot 20, 30 to detect the plane in which the sheets 90 are placed on the rack 50 and automatically correct any deviation to ensure sheets are packed compactly and without variation. Completed/packed rack 50 is removed and replaced with new or empty rack using a turntable.

The invention also provides embodiments wherein the robotic sheet stacking system 10 has only one robot arm 20. Reference is made to the non-limiting embodiments shown in FIGS. 13-17 and 20-21. In single-robot embodiments, the robot arm 20 can be of the nature described above for the first robot arm 20 shown in FIGS. 1-11. For example, the robot arm 20 is rotatable about multiple axes, preferably four or more (e.g., six) axes. Thus, the robot arm 20 preferably is configured to lift one or more sheets 90 from the conveyor line 40 and thereafter rotate such sheet(s) about multiple axes.

In the present embodiments, the system 10 comprises a single robot arm 20 and a conveyor line 40. The robot arm 20 has a free end region 28 to which is attached a suction frame 200. The robot arm 20 is positioned adjacent an end region 45 of the conveyor line 40. In the illustrated embodiment, the robot arm 20 is positioned alongside an intermediate loading space, which is located downstream of the conveyor line end region 45 and upstream of a storage rack 50.

Preferably, the robot arm 20 has a vertical rotation axis that is spaced laterally outwardly and longitudinally downstream from an end region 45 of the conveyor line 40. This preferably is the case for the or each robot arm 20, 30 in any embodiment of the present disclosure. Additionally or alternatively, the robot arm 20 can optionally have a mount base that is spaced laterally outwardly and longitudinally downstream from the end region 45 of the conveyor line 40. As illustrated, the mount base preferably is mounted to a floor.

In the present single-robot embodiments, the conveyor line 40 can be of the nature described elsewhere in this disclosure. For example, it preferably includes a cantilevered end region 45 with a plurality of longitudinal gaps 47. In more detail, the end region 45 of the conveyor line 40 preferably is a cantilevered end region with an underpass that is open on a downstream side, and the cantilevered end region preferably has a plurality of individual conveyors bounding between them a plurality of longitudinal gaps 47, which are open to the underpass. In addition, the conveyor line 40 can optionally include an adjacent upstream section 42, e.g., of the nature described elsewhere in this disclosure.

Preferably, the suction frame 200 can be positioned so as to be received in (e.g., project upwardly through) a plurality of longitudinal gaps 47 between individual conveyors (e.g., individual conveyor belts) of the conveyor line end region 45 so as to engage (via the suction cups or other suction devices on the suction frame) one or more sheets 90 on the conveyor line 40. In the embodiments illustrated, the longitudinal gaps 47 open through the downstream end of the conveyor end region 45 (i.e., are open in a longitudinal downstream direction). Thus, when the suction frame 200 is received in a plurality of the longitudinal gaps 47, it may project (in an upstream direction) through the downstream end of the conveyor end region 45.

The illustrated robot arm 20 is configured to load sheets 90 (and when operated, it loads sheets) onto a single rack 50. The illustrated rack 50 is directly downstream from (e.g., is in line with the path of substrate travel along) the end region 45 of the conveyor line 40. It is to be appreciated, however, that the rack could alternatively be positioned elsewhere, or the robot arm could be configured to load two or more nearby racks.

The suction frame 200 of the robot arm 20 (e.g., while unloaded) can be lowered and moved toward the end region 45 of the conveyor line 40. Subsequently, the suction frame 200 of the robot arm 20 (e.g., while carrying one or more sheets 90) can be elevated and moved toward the storage rack 50. Reference is made to FIGS. 13-17 and 20-21.

Thus, the robotic sheet stacking system 10 preferably has a first position in which the robot arm 20 is elevated and has the suction frame 200 loaded with one or more sheets 90, and a second position in which the robot arm is lowered and has the first suction frame unloaded. Preferably, the system 10 also has a third position in which the robot arm 20 is adjacent the rack 50 and has the suction frame 200 loaded with one or more sheets 90.

In more detail, the present unloading operation includes: (a) the robot arm 20 (e.g., the free end 28 thereof, and the suction frame 200, while unloaded) moving toward the end region 45 of the conveyor line 40, and subsequently (b) the robot arm (e.g., the free end thereof, and the suction frame, while carrying one or more sheets 90) moving toward the rack 50. This sequence of steps (a) and (b) can be repeated as many times as necessary to unload the desired number of sheets from the conveyor line.

With continued reference to FIGS. 13-17 and 20-21, it can be appreciated that the illustrated conveyor line 40 has a cantilevered end region 45, and the system 10 has an approach configuration in which the suction frame 200 is beneath the cantilevered end region of the conveyer line. In addition, the system 10 preferably has a picking configuration in which the free end region 28 (e.g., a beam of the free end region) of the robot arm 20 extends crosswise beneath (e.g., generally perpendicular to frame members 70 of) the cantilevered end region 45 of the conveyor line 40, such that the suction frame 200 projects upwardly through the plurality of longitudinal gaps 47 so as to engage one or more sheets 90 on the conveyor line (see FIGS. 13, 14, 16, and 20).

Furthermore, the system has a first loaded configuration in which the suction frame retains one or more sheets in a first rotational position adjacent the conveyor line, and the system has a second loaded configuration wherein the suction frame retains such sheet(s) in a second rotational position adjacent the rack. Preferably, when the system is in the first loaded configuration, such sheet(s) are retained in a horizontal orientation, and when the system is in the second loaded configuration, such sheet(s) are retained in a generally vertical orientation. In certain embodiments (e.g., where the robot arm is equipped with a rotate-tool suction frame), such sheets(s) are effectively offset rotationally by about 90 degrees relative to a vertical axis when in the second rotational position as compared with the first rotational position. This can be appreciated, for example, by referring to FIGS. 13-15.

In one group of embodiments, the system has a first loaded configuration in which the suction frame retains two sheets in a first rotational position adjacent the conveyor line, and the system has a second loaded configuration in which the suction frame retains those two sheets in a second rotational position adjacent the storage rack. In certain embodiments of this nature, the two sheets are effectively offset rotationally by about 90 degrees relative to a vertical axis when in the second rotational position as compared with the first rotational position, and when the system is in the first loaded configuration the two sheets are spaced apart from each other along a longitudinal axis of the conveyor line, whereas when the system is in the second loaded position the two sheets are side-by-side such that two bottom edges of the two sheets are substantially flush with each other and substantially equidistant from a base (e.g., a bottom wall) 55 of the adjacent storage rack 50. Reference is made once again to FIGS. 13-15.

With respect to the tooling (e.g., the suction frame 200) with which the robot arm 20 can be equipped, the illustrated robot arm 20 has a free end region 28 comprising a beam (e.g., a mast). That beam preferably is elongated along a final rotation axis of the robot arm. In the embodiments illustrated, the suction frame 200 has a plurality of frame members (e.g., arms) 70 that are crosswise to the noted beam and carry a plurality of suction cups. In such cases, the frame members 70 can optionally be parallel (or at least generally parallel) to each other and perpendicular (or at least generally perpendicular) to the beam. It is to be appreciated, however, that the suction frame 200 can alternatively be provided in other configurations, such as a pitchfork-like configuration wherein a plurality of frame members are parallel to each other and to a final rotation axis of the robot arm. Certain preferred tooling (e.g., suction frame) options will now be described in more detail.

In FIGS. 1-11 and 13-17, each robot arm 20, 30 is equipped with a rotate-tool suction frame 200, 300, whereas in FIGS. 18-21, each robot arm 20, 30 is equipped with a non-rotate-tool suction frame 200, 300. When a robot arm 20, 30 is equipped with a rotate-tool suction frame 200, 300, it is possible to perform a quarter-turn operation (described above) on each load of one or more sheets 90. This can be appreciated, for example, by referring to FIGS. 13-15. In contrast, when a robot arm 20, 30 is equipped with a non-rotate-tool suction frame 200, 300, the robot arm is configured to perform (and during use, performs) an unloading operation in which each load of one or more sheets 90 is rotated about a horizontal axis but not about a vertical axis. This can be appreciated by referring to FIGS. 18-21.

When the illustrated non-rotate-tool suction frame is used, the beam of the robot arm's free end region 28, 38 is longer than (optionally at least 1.5 times longer than, such as more than twice as long as) the frame members 70 extending therefrom. In contrast, when the illustrated rotate-tool suction frame is used, the beam of the robot arm's free end region 28, 38 is shorter than the frame members 70 extending therefrom. It is to be appreciated, however, that this is by no means required.

The illustrated rotate-tool suction frame has fewer frame members 70 than the illustrated non-rotate-tool suction frame. The rotate-tool suction frame, for example, can optionally have four or fewer (e.g., three) frame members 70, while the non-rotate-tool suction frame has more than four (e.g., six) frame members 70. It is to be appreciated, however, that the particular number of frame members 70 on a given suction frame can be varied to accommodate the particular configuration of a given conveyor end region 45 and the particular sheet sizes and shapes to be handled. Thus, the examples given in this paragraph are by no means limiting.

In some cases, the robotic tool changing system 10 includes an optional automated tool-change station 21, 31 for each robot arm 20, 30. Reference is made to FIG. 1. Suitable automated tool changers are available commercially from ATI Industrial Automation of Apex, N.C., USA. When an automated tool changer 21, 31 is provided for a given robot arm 20, 30, the system 10 is configured to autonomously change the suction frame 200, 300 on the robot arm (e.g., removing an initial suction frame and replacing it with another suction frame). In more detail, the system 10 in such embodiments is configured to: (i) perform a series of unloading operations using a selected robot arm equipped with a first suction frame (e.g., one of a rotate-tool suction frame and a non-rotate-tool suction frame), (ii) autonomously change the suction frame on the selected robot arm (e.g., removing the first suction frame and replacing it with a second suction frame, e.g., the other of the rotate-tool suction frame and the non-rotate-tool suction frame), and (iii) perform another series of unloading operations using the selected robot arm while equipped with the second suction frame. In the embodiment of FIG. 1, the system 10 includes two robot arms 20, 30 and two corresponding automated tool-change stations 21, 31 located directly across the cantilevered end region 45 from each other. It is to be appreciated, however, that various other placement options may be suitable.

Furthermore, the robotic tool changing system 10 can optionally include a skew conveyor. In the embodiments illustrated, the adjacent upstream conveyor section 42 comprises (e.g., is) a skew conveyor. When provided, the skew conveyor is configured (and during use, is operated) to simultaneously move a sheet 90 both along the path of substrate travel (e.g., longitudinally) and cross-wise to the path of substrate travel (e.g., laterally). As shown in FIGS. 22 and 23, the skew conveyor includes a series of transport rollers that can be adjusted to different angles (i.e., their rotation axes can be oriented at different angles relative to the path of substrate travel), rather than just being fixed in positions perpendicular to the path of substrate travel.

The illustrated skew conveyor is a dual-lane skew conveyer, i.e., it is configured to simultaneously convey two sheets (e.g., glass sheets) 90 respectively along two parallel (e.g., side-by-side) lanes extending along the path of substrate. Reference is made to FIG. 23. Here, it can be appreciated that the illustrated skew conveyor includes first 46A and second 46B beds of adjustable transport rollers. In the embodiment illustrated, the first bed 46A spans a first lateral width (e.g., a first lateral half width) of the conveyance area while the second bed 46B spans a second lateral width (e.g., a second lateral half width) of the conveyance area. The angle of the transport rollers of the first bed 49A is adjustable independently of the angle of the transport rollers of the second bed 49A. This too can be appreciated by referring to FIG. 23.

Furthermore, the illustrated skew conveyor has an optional alignment fence 44. The illustrated adjustment fence 44 is elongated longitudinally (i.e., is elongated in a direction parallel to the path of substrate travel along the skew conveyor). The adjustment fence 44 can, for example, be a rail of the nature shown in FIGS. 22 and 23. As can be appreciated by comparing those two figures, the illustrated alignment fence 44 is adjustable. That is, it can be positioned at different lateral locations on the conveyance area.

In FIG. 23, the alignment fence 44 has been positioned at a lateral midpoint (e.g., approximately at a halfway point along the width) of the conveyance area. The two beds 46A, 46B of adjustable transport rollers are therefore skewed inwardly, such that two sheets 90 respectively moving along the two beds of adjustable transport rollers will (while simultaneously being conveyed longitudinally) be moved inwardly into contact with the alignment fence, thereby positioning them in desired lanes prior to reaching the end region 45 of the conveyor line 40.

Turning now to FIG. 22, it can be appreciated that the alignment fence 44 can be positioned at different lateral locations on the conveyance area. In FIG. 22, the skew conveyor is configured to convey sheets 90 one-by-one along a single lane (rather than conveying two sheets side-by-side along two lanes). The two beds 46A, 46B of adjustable transport rollers are therefore skewed at a common angle, such that a sheet 90 moving along the adjustable transport rollers will (while simultaneously being conveyed longitudinally) be moved to the right until contacting the alignment fence, thereby positioning it in a desired central lane prior to reaching the end region 45 of the conveyor line 40. Thus, in FIG. 22, the alignment fence 44 is positioned to convey sheets 90 along a central lane of the conveyance area.

It will be appreciated that, when it is desired to convey sheets along a central lane of the conveyance area, the optimal position of the alignment fence 44 will vary based on the size and shape of a given sheet. Thus, when provided, the alignment fence 44 preferably is adjustable continuously along at least a certain range (optionally along at least half, such as an entirety) of the conveyance area width. Such adjustability, for example, can facilitate moving sheets of many different sizes one one-by-one along a central lane of the conveyance area. Furthermore, the present invention more broadly provides embodiments wherein the skew conveyor is not part of a robotic sheet stacking system (e.g., and may not be located upstream from a cantilevered conveyor end region 45), but rather is provide as part of any other sheet (e.g., glass sheet) conveyance system.

Various examples have been described. These and other examples are within the scope of the following claims.

The invention claimed is:

1. A robotic sheet stacking system comprising first and second robot arms and a conveyor line, the first and second robot arms being located on opposite sides of the conveyor line, the first robot arm having a free end region to which is attached a first suction frame, the second robot arm having a free end region to which is attached a second suction frame, the system having a first position in which the first robot arm is elevated and has the first suction frame loaded with one or more sheets while the second robot arm is lowered and has the second suction frame unloaded, and the system has a second position in which the second robot arm is elevated and has the second suction frame loaded with one or more sheets while the first robot arm is lowered and has the first suction frame unloaded, the conveyor line having a cantilevered end region comprising a plurality of individual conveyor belts with longitudinal gaps therebetween, wherein the system has a first picking configuration in which a first beam of the free end region of the first robot arm extends crosswise directly below the conveyor belts of the cantilevered end region such that the first suction frame projects upwardly through the longitudinal gaps between the individual conveyor belts of the cantilevered end region so as to engage one or more sheets on the conveyor line, the first beam being rotatable about a rotation axis along which the first beam is elongated.

2. The robotic sheet stacking system of claim 1 wherein the first suction frame is above the second suction frame when the system is in the first position, and the second suction frame is above the first suction frame when the system is in the second position.

3. The robotic sheet stacking system of claim 1 wherein the system also has a third position in which the first robot arm is adjacent a storage rack and has the first suction frame loaded with one or more sheets while the second robot arm is adjacent the conveyor line and has the second suction frame unloaded.

4. The robotic sheet stacking system of claim 3 wherein the system also has a fourth position in which the second robot arm is adjacent the storage rack and has the second suction frame loaded with one or more sheets while the first robot arm is adjacent the conveyor line and has the first suction frame unloaded.

5. The robotic sheet stacking system of claim 1 wherein the conveyor line is a single conveyor line, and the system includes a controller configured to move the first and second robot arms in a sequentially alternating unloading operation in which both the first and second robot arms remove sheets from the single conveyor line.

6. The robotic sheet stacking system of claim 5 wherein the system is arranged such that the first and second robot arms are both configured to stack the glass sheets on a single rack located directly downstream from the conveyor line.

7. The robotic sheet stacking system of claim 1 wherein the system has a first approach configuration in which the first suction frame is beneath the cantilevered end region of the conveyer line, and the system has a second approach configuration in which the second suction frame is beneath the cantilevered end region of the conveyor line.

8. The robotic sheet stacking system of claim 1 wherein the conveyor line includes an upstream region that is adjacent to and upstream from the cantilevered end region, the upstream region comprising transport rollers configured such that a glass sheet conveyed along the conveyor line is conveyed from transport rollers of the upstream region directly onto conveyor belts of the cantilevered end region.

9. The robotic sheet stacking system of claim 1 wherein the first robot arm is configured to lift a sheet from the conveyor line and thereafter rotate the sheet about multiple axes.

10. The robotic sheet stacking system of claim 1 wherein the first suction frame comprises a plurality of frame members that are crosswise to the first beam and carry a plurality of suction cups, and wherein the free end region of the second robot arm comprises a second beam that is elongated along a rotation axis of the second robot arm, the second suction frame comprising a plurality of frame members that are crosswise to the second beam and carry a plurality of suction cups.

11. The robotic sheet stacking system of claim 10 wherein one or more of the suction cups are extendable and retractable so as to each have a retracted position and an extended position, such that each such suction cup is configured to move from the retracted position to the extended position in response to operation of an actuator.

12. The robotic sheet stacking system of claim 1 wherein the conveyor line comprises a skew conveyor.

13. The robotic sheet stacking system of claim 12 wherein the skew conveyor is a dual-lane skew conveyor having an adjustable alignment fence.

14. The robotic sheet stacking system of claim 1 further comprising a storage rack configured to retain a stack of sheets in a vertical-offset position, the conveyor line configured to convey sheets in a horizontal position.

15. The robotic sheet stacking system of claim 1 wherein the cantilevered end region has a downstream end, and the longitudinal gaps open through the downstream end of the cantilevered end region, such that when the first suction frame is received in a plurality of the longitudinal gaps it projects, in an upstream direction, through the downstream end of the cantilevered end region.

16. A robotic sheet stacking system comprising first and second robot arms and a conveyor line, the first and second robot arms being located on opposite sides of the conveyor line, the first robot arm having attached thereto a first suction frame, the second robot arm having attached thereto a second suction frame, the system having a first position in which the first robot arm is elevated and has the first suction frame loaded with one or more sheets while the second robot arm is lowered and has the second suction frame unloaded, and the system has a second position in which the second robot arm is elevated and has the second suction frame loaded with one or more sheets while the first robot arm is lowered and has the first suction frame unloaded, wherein the system has a first loaded configuration in which the first suction frame retains two sheets in a first rotational position adjacent the conveyor line, and the system has a second loaded configuration wherein the first suction frame retains said two sheets in a second rotational position adjacent a storage rack, such that said two sheets are effectively offset rotationally by about 90 degrees relative to a vertical axis when in the second rotational position as compared with the first rotational position.

17. The robotic sheet stacking system of claim 16 wherein when the system is in the first loaded configuration said two sheets are spaced apart from each other along a longitudinal axis of the conveyor line, and when the system is in the second loaded position said two sheets are side-by-side such that two bottom edges of said two sheets are substantially flush with each other and substantially equidistant from a bottom wall of an adjacent storage rack.

18. A method of using a robotic sheet stacking system to stack glass sheets, the robotic sheet stacking system comprising first and second robot arms and a conveyor line, the first robot arm having a free end region to which is attached a first suction frame, the second robot arm having a free end region to which is attached a second suction frame, the method comprising conveying a plurality of glass sheets along the conveyor line and moving the first and second robot arms in a sequentially alternating unloading operation such that the system has a first position in which the first robot arm is elevated and has the first suction frame loaded with one or more sheets while the second robot arm is lowered and has the second suction frame unloaded and the system has a second position in which the second robot arm is elevated and has the second suction frame loaded with one or more sheets while the first robot arm is lowered and has the first suction frame unloaded, the conveyor line having a cantilevered end region comprising a plurality of individual conveyors having longitudinal gaps therebetween, wherein the method comprises moving the system into a first picking configuration in which a first beam of the free end region of the first robot arm extends crosswise directly below the conveyors of the cantilevered end region of the conveyer line such that the first suction frame projects upwardly through the longitudinal gaps between the individual conveyors of the cantilevered end region of the conveyor line so as to engage one or more sheets on the conveyor line, the first beam being rotatable about a rotation axis along which the first beam is elongated.

19. The method of claim 18 wherein the sequentially alternating unloading operation is performed such that the first suction frame is above the second suction frame during at least some time when the system is in the first position and the second suction frame is above the first suction frame during at least some time when the system is in the second position.

20. The method of claim 18 wherein the sequentially alternating unloading operation is performed such that the system also has a third position in which the first robot arm is adjacent a storage rack and has the first suction frame loaded with one or more sheets while the second robot arm is adjacent the conveyor line and has the second suction frame unloaded, the first suction frame being at a higher elevation than the second suction frame during at least some time when the system is in the third position.

21. The method of claim 20 wherein the sequentially alternating unloading operation is performed such that the system also has a fourth position in which the second robot arm is adjacent the storage rack and has the second suction frame loaded with one or more sheets while the first robot arm is adjacent the conveyor line and has the first suction frame unloaded, such that the second suction frame is at a higher elevation than the first suction frame during at least some time when the system is in the fourth position.

22. The method of claim 18 wherein the conveyor line is a single conveyor line and the sequentially alternating unloading operation is performed such that both the first and second robot arms remove glass sheets from the single conveyor line.

23. The method of claim 18 wherein the sequentially alternating unloading operation is performed such that the system has a first approach configuration in which the first suction frame is beneath the cantilevered end region of the conveyer line and the system has a second approach configuration in which the second suction frame is beneath the cantilevered end region of the conveyer line.

24. The method of claim 23 wherein the method includes moving the first robot arm along an upper motion path toward a rack while simultaneously moving the second robot arm along a lower motion path toward the cantilevered end region of the conveyor line.

25. The method of claim 18 wherein the first robot arm is operated to lift a sheet from the conveyor line and thereafter rotate the sheet about multiple axes.

26. The method of claim 18 wherein the sequentially alternating unloading operation produces a stack of glass sheets positioned on a storage rack in a vertical-offset position, and said conveying the plurality of glass sheets along the conveyor line involves conveying the plurality of glass sheets in a horizontal orientation.

27. A method of using a robotic sheet stacking system to stack glass sheets, the robotic sheet stacking system comprising first and second robot arms and a conveyor line, the first robot arm having a free end region to which is attached a first suction frame, the second robot arm having a free end region to which is attached a second suction frame, the method comprising conveying a plurality of glass sheets along the conveyor line and moving the first and second robot arms in a sequentially alternating unloading operation such that the system has a first position in which the first robot arm is elevated and has the first suction frame loaded with one or more sheets while the second robot arm is lowered and has the second suction frame unloaded and the system has a second position in which the second robot arm is elevated and has the second suction frame loaded with one or more sheets while the first robot arm is lowered and has the first suction frame unloaded, wherein the sequentially alternating unloading operation is performed such that the system has a first loaded configuration in which the first suction frame retains two sheets in a first rotational position adjacent the conveyor line, and the system has a second loaded configuration wherein the first suction frame retains said two sheets in a second rotational position adjacent a storage rack, such that said two sheets are effectively offset rotationally relative to a vertical axis by about 90 degrees when in the second rotational position as compared with the first rotational position.

28. The method of claim 11 wherein the sequentially alternating unloading operation is performed such that when the system is in the first loaded configuration said two sheets are spaced apart from each other along a longitudinal axis of the conveyor line and when the system is in the second loaded position said two sheets are side-by-side such that two bottom edges of said two sheets are substantially flush with each other and substantially equidistant from a bottom wall of an adjacent storage rack.

29. A robotic sheet stacking system comprising first and second robot arms and a conveyor line, the conveyor line configured to convey glass sheets in a machine direction along which the conveyor line is elongated, the first and second robot arms being located on opposite sides of the conveyor line and being configured to move independently of each other, the first robot arm comprising a free end region having attached thereto a first suction frame, the second robot arm comprising a free end region having attached thereto a second suction frame, the conveyor line having a cantilevered end region with an underpass that is open on a downstream side, such that the first and second suction frames are each configured to travel in a counter-machine direction starting from a downstream position, which is spaced from the cantilevered end region in the machine direction, to an approach position underneath the cantilevered end region, wherein the first suction frame when in the approach position is in a first rotational orientation about a vertical axis, and wherein the first suction frame when in the downstream position is in a second rotational orientation about a vertical axis, the first and second rotational orientations being offset by greater than 25 degrees.

30. The robotic sheet stacking system of claim 29 wherein the cantilevered end region of the conveyor line comprises a plurality of individual conveyors bounding between them a plurality of longitudinal gaps, the longitudinal gaps being elongated in the machine direction, the system having a first picking configuration in which a first beam of the free end region of the first robot arm extends crosswise directly below the conveyors of the cantilevered end region such that the first suction frame projects upwardly through the longitudinal gaps so as to engage one or more glass sheets on the cantilevered end region of the conveyor line, the first beam being rotatable about a rotation axis along which the first beam is elongated.

31. The robotic sheet stacking system of claim 29 wherein the first and second rotational orientations are offset by between 30 and 60 degrees.

32. The robotic sheet stacking system of claim 29 wherein the cantilevered end region of the conveyor line has a plurality of individual conveyors bounding between them a plurality of longitudinal gaps, the longitudinal gaps being elongated in the machine direction, the longitudinal gaps configured to enable the first suction frame to project upwardly through the longitudinal gaps so as to engage one or more glass sheets on the cantilevered end region of the conveyor line, and wherein the underpass of the cantilevered end region is open laterally and is open to the longitudinal gaps.

33. The robotic sheet stacking system of claim 32 wherein the longitudinal gaps are open on a downstream end.

34. The robotic sheet stacking system of claim 29 wherein the first and second robot arms respectively have first and second vertical rotation axes that are located laterally outwardly and longitudinally downstream from the cantilevered end region of the conveyor line.

35. A method of using a robotic sheet stacking system to stack glass sheets, the robotic sheet stacking system comprising first and second robot arms and a conveyor line, the method comprising conveying a glass sheet along the conveyor line in a machine direction, the conveyor line being elongated in the machine direction, the first and second robot arms being located on opposite sides of the conveyor line, the method comprising moving the first and second robot arms independently of each other, the first robot arm comprising a free end region having attached thereto a first suction frame, the second robot arm comprising a free end region having attached thereto a second suction frame, the conveyor line having a cantilevered end region with an underpass that is open on a downstream side, and the method comprising sequentially moving the first and second robot arms such that the first and second suction frames sequentially travel in a counter-machine direction, starting from a downstream position, which is spaced from the cantilevered end region in the machine direction, to an approach position underneath the cantilevered end region, wherein the first suction frame when in the approach position is in a first rotational orientation about a vertical axis, and wherein the first suction frame when in the downstream position is in a second rotational orientation about a vertical axis, the first and second rotational orientations being offset by greater than 25 degrees.

36. The method of claim 35 wherein the first robot arm is operated to lift a first sheet from the conveyor line and thereafter rotate the first sheet about multiple axes, and the second robot arm is subsequently operated to lift a second sheet from the conveyor line and thereafter rotate the second sheet about multiple axes.

37. The method of claim 35 wherein the first and second rotational orientations are offset by between 30 and 60 degrees.

38. The method of claim 35 wherein the method includes moving the first robot arm along an upper motion path toward a rack while simultaneously moving the second robot arm along a lower motion path toward the cantilevered end region of the conveyor line.

39. A robotic sheet stacking system comprising a robot arm and a conveyor line, the robot arm being rotatable about four or more axes, the robot arm having a free end region to which is attached a suction frame, the robot arm having a vertical rotation axis that is spaced laterally outwardly and longitudinally downstream from an end region of the conveyor line, wherein the system has a first loaded configuration in which the suction frame retains one or more sheets in a first rotational position adjacent the conveyor line, and the system has a second loaded configuration wherein the first suction frame retains said one or more sheets in a second rotational position adjacent a storage rack, such that said one or more sheets are effectively offset rotationally by about 90 degrees relative to a vertical axis when in the second rotational position as compared with the first rotational position.

40. The robotic sheet stacking system of claim 39 wherein the free end of the robot arm comprises a beam that is elongated along a rotation axis of the robot arm, and the suction frame has a plurality of frame members that are crosswise to the beam, said frame members carrying a plurality of suction cups.

41. The robotic sheet stacking system of claim 40 wherein the end region of the conveyor line is a cantilevered end region with an underpass that is open on a downstream side, the cantilevered end region of the conveyor line having a plurality of individual conveyors bounding between them a plurality of longitudinal gaps, the longitudinal gaps being open to the underpass.

42. The robotic sheet stacking system of claim 41 wherein the system has an approach configuration in which the suction frame is positioned beneath the cantilevered end region of the conveyer line.

43. The robotic sheet stacking system of claim 41 wherein the system has a picking configuration in which the beam of the free end region of the robot arm extends crosswise directly beneath the individual conveyors of the cantilevered end region of the conveyor line, such that the suction frame projects upwardly through the plurality of longitudinal gaps so as to engage one or more sheets on the conveyor line.

44. The robotic sheet stacking system of claim 41 wherein the cantilevered end region of the conveyor line has a downstream end, and the longitudinal gaps open through the downstream end of the cantilevered end region, such that when the suction frame is received in a plurality of the longitudinal gaps it projects, in an upstream direction, through the downstream end of the cantilevered end region.

45. The robotic sheet stacking system of claim 39 wherein said frame members are parallel to each other and perpendicular to the beam.

46. The robotic sheet stacking system of claim 45 wherein the beam is shorter than the frame members.

47. The robotic sheet stacking system of claim 39 wherein when the system is in the first loaded configuration said one or more sheets are retained in a horizontal orientation, and when the system is in the second loaded position said one or more sheets are retained in a generally vertical orientation.

48. The robotic sheet stacking system of claim 39 wherein the robot arm is configured to lift one or more sheets from the conveyor line and thereafter rotate said sheet or sheets about multiple axes.

49. The robotic sheet stacking system of claim 39 wherein when the system is in the first loaded configuration the suction frame retains two sheets in the first rotational position adjacent the conveyor line, and when the system is in the second loaded configuration the suction frame retains said two sheets in the second rotational position adjacent the storage rack, such that said two sheets are effectively offset rotationally by about 90 degrees relative to a vertical axis when in the second rotational position as compared with the first rotational position, wherein when the system is in the first loaded configuration said two sheets are spaced apart from each other along a longitudinal axis of the conveyor line, and when the system is in the second loaded position said two sheets are side-by-side such that two bottom edges of said two sheets are substantially flush with each other and substantially equidistant from a bottom wall of the storage rack.

50. The robotic sheet stacking system of claim 39 wherein the conveyor line comprises a skew conveyor.

51. The robotic sheet stacking system of claim 50 wherein the skew conveyor is a dual-lane skew conveyor having an adjustable alignment fence.

\* \* \* \* \*